US011228855B2

(12) United States Patent
Yokoyama et al.

(10) Patent No.: US 11,228,855 B2
(45) Date of Patent: Jan. 18, 2022

(54) INFORMATION PROCESSING DEVICE AND INFORMATION PROCESSING METHOD

(71) Applicant: SONY CORPORATION, Tokyo (JP)

(72) Inventors: Ryo Yokoyama, Tokyo (JP); Osamu Ito, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 16/628,082

(22) PCT Filed: Jul. 3, 2018

(86) PCT No.: PCT/JP2018/025275
§ 371 (c)(1),
(2) Date: Jan. 2, 2020

(87) PCT Pub. No.: WO2019/013055
PCT Pub. Date: Jan. 17, 2019

(65) Prior Publication Data
US 2021/0152962 A1 May 20, 2021

Related U.S. Application Data

(60) Provisional application No. 62/534,879, filed on Jul. 20, 2017, provisional application No. 62/530,455, filed on Jul. 10, 2017.

(51) Int. Cl.
*H04R 27/00* (2006.01)
*G06F 3/16* (2006.01)
(Continued)

(52) U.S. Cl.
CPC ............ *H04R 27/00* (2013.01); *G06F 3/165* (2013.01); *G10L 25/51* (2013.01); *H04R 1/028* (2013.01);
(Continued)

(58) Field of Classification Search
CPC .......... H04R 27/00; H04R 3/00; H04R 1/028; H04R 2400/03; H04R 2201/023;
(Continued)

(56) References Cited

U.S. PATENT DOCUMENTS 5,553,148 A 9/1996 Werle
9,886,091 B2 2/2018 Yliaho et al.
(Continued)

FOREIGN PATENT DOCUMENTS

CN 101828382 A 9/2010
CN 102016759 A 4/2011
(Continued)

OTHER PUBLICATIONS

Office Action for CN Patent Application No. 201880045010.3 dated Dec. 3, 2020, 7 pages of Office Action and 10 pages of English Translation.

(Continued)

*Primary Examiner* — Akelaw Teshale
(74) *Attorney, Agent, or Firm* — Chip Law Group

(57) ABSTRACT

An information processing device is provided to present a sensation to a user taking a delay occurring before sound is perceived by the user appropriately into consideration. The information processing device includes a generation section that generates, on the basis of a difference between a first timing at which a sound is to be outputted from an acoustic presentation section and a second timing at which the sound is to be perceived by a first user, first data to be used for presentation of a sensation to the first user by a sensation presentation section worn by the first user.

15 Claims, 21 Drawing Sheets

(51) Int. Cl.
  *G10L 25/51* (2013.01)
  *H04R 1/02* (2006.01)
  *H04R 3/00* (2006.01)

(52) U.S. Cl.
  CPC ......... *H04R 3/00* (2013.01); *H04R 2201/023* (2013.01); *H04R 2400/03* (2013.01); *H04R 2430/01* (2013.01)

(58) Field of Classification Search
  CPC ........ H04R 2430/01; H04R 5/04; H04R 5/02; H04R 29/00; H04R 2499/11; H04R 1/1016; H04R 2420/07; H04R 2499/13; H04R 3/04; H04R 5/033; H04R 2227/003; H04R 2460/07; H04R 3/12; H04R 5/027; H04R 17/00; H04R 1/1083; H04R 1/2838; H04R 1/345; H04R 1/403; H04R 2201/34; H04R 2430/20; H04R 2460/09; H04R 2499/15; H04R 29/001; H04R 29/007; H04R 1/02; H04R 1/1008; H04R 1/1041; H04R 1/288; H04R 2201/025; H04R 2201/405; H04R 2203/12; H04R 2205/041; H04R 2225/41; H04R 2227/005; H04R 2227/007; H04R 2460/01; H04R 2460/13; H04R 25/00; H04R 25/407; H04R 25/43; H04R 25/554; H04R 29/002; H04R 29/008; H04R 3/005; G06F 3/165; G10L 25/51
  See application file for complete search history.

(56) References Cited

U.S. PATENT DOCUMENTS

| | | | |
|---|---|---|---|
| 10,649,529 B1 | 5/2020 | Nekimken et al. | |
| 10,713,908 B2 | 7/2020 | Yokoyama et al. | |
| 10,739,856 B2* | 8/2020 | Yokoyama | G06F 3/016 |
| 2010/0217413 A1* | 8/2010 | Seiler | H04R 1/02 |
| | | | 700/94 |
| 2011/0063208 A1* | 3/2011 | Van Den Eerenbeemd | G06F 3/011 |
| | | | 345/156 |
| 2011/0080273 A1* | 4/2011 | Kawai | G06F 3/016 |
| | | | 340/407.1 |
| 2014/0266644 A1 | 9/2014 | Wheubel | |
| 2015/0373477 A1* | 12/2015 | Norris | H04S 1/007 |
| | | | 381/303 |
| 2016/0027264 A1 | 1/2016 | Choi et al. | |
| 2018/0033263 A1* | 2/2018 | Novich | G10H 3/26 |
| 2019/0196596 A1 | 7/2019 | Yokoyama et al. | |

FOREIGN PATENT DOCUMENTS

| | | |
|---|---|---|
| CN | 103098123 A | 5/2013 |
| CN | 104049735 A | 9/2014 |
| CN | 105282591 A | 1/2016 |
| CN | 105723735 A | 6/2016 |
| CN | 106774891 A | 5/2017 |
| DE | 102013214201 A1 | 1/2015 |
| JP | 55-59499 A | 5/1980 |
| JP | 57-148980 U | 9/1982 |
| JP | 2004-233463 A | 8/2004 |
| JP | 2006-222826 A | 8/2006 |
| WO | 2010/093913 A1 | 8/2010 |

OTHER PUBLICATIONS

Office Action for CN Patent Application No. 201880045075.8 dated Dec. 3, 2020, 7 pages of Office Action and 11 pages of English Translation.

International Search Report and Written Opinion of PCT Application No. PCT/JP2018/025275, dated Aug. 28, 2018, 07 pages of ISRWO.

Office Action for CN Patent Application No. 201880045075.8, dated Apr. 22, 2021, 3 pages of Office Action and 5 pages of English Translation.

Non-Final Office Action for U.S. Appl. No. 16/628,089, dated Mar. 26, 2021, 29 pages.

* cited by examiner

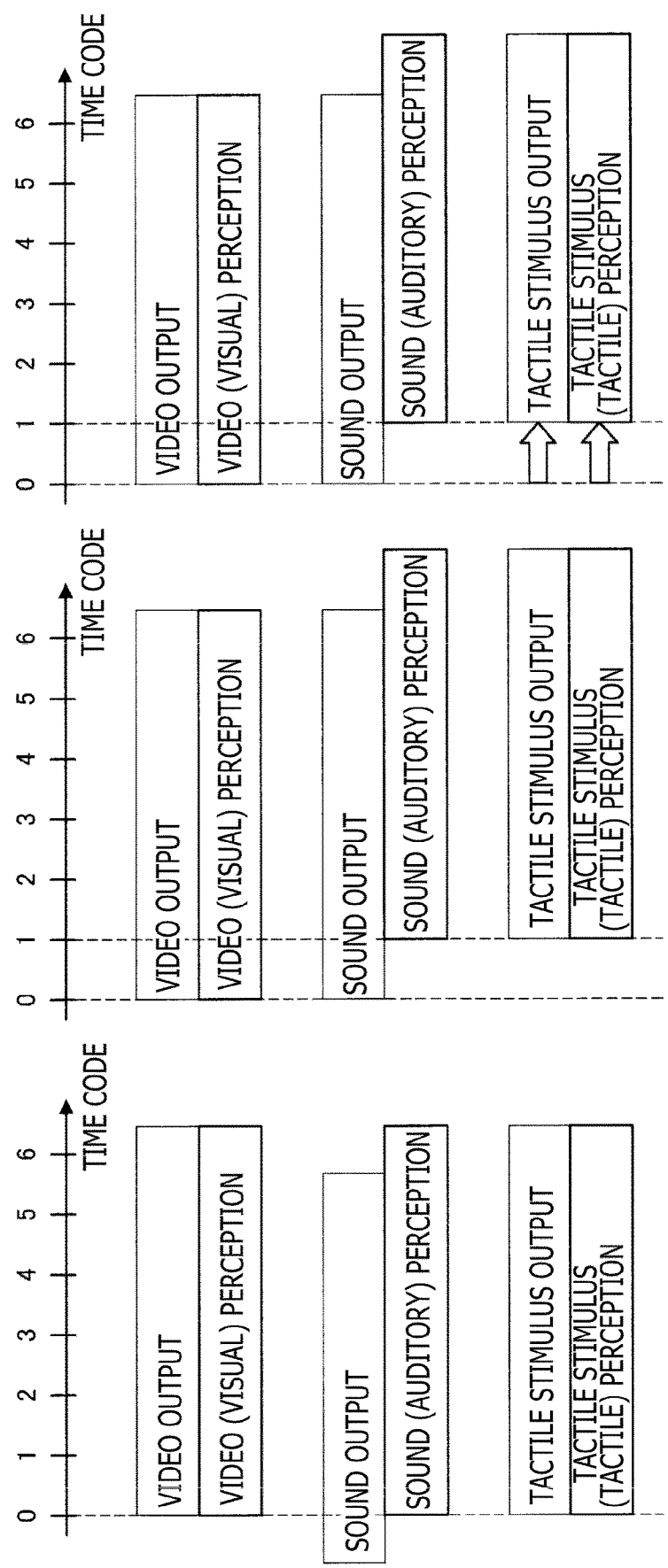

FIG.14
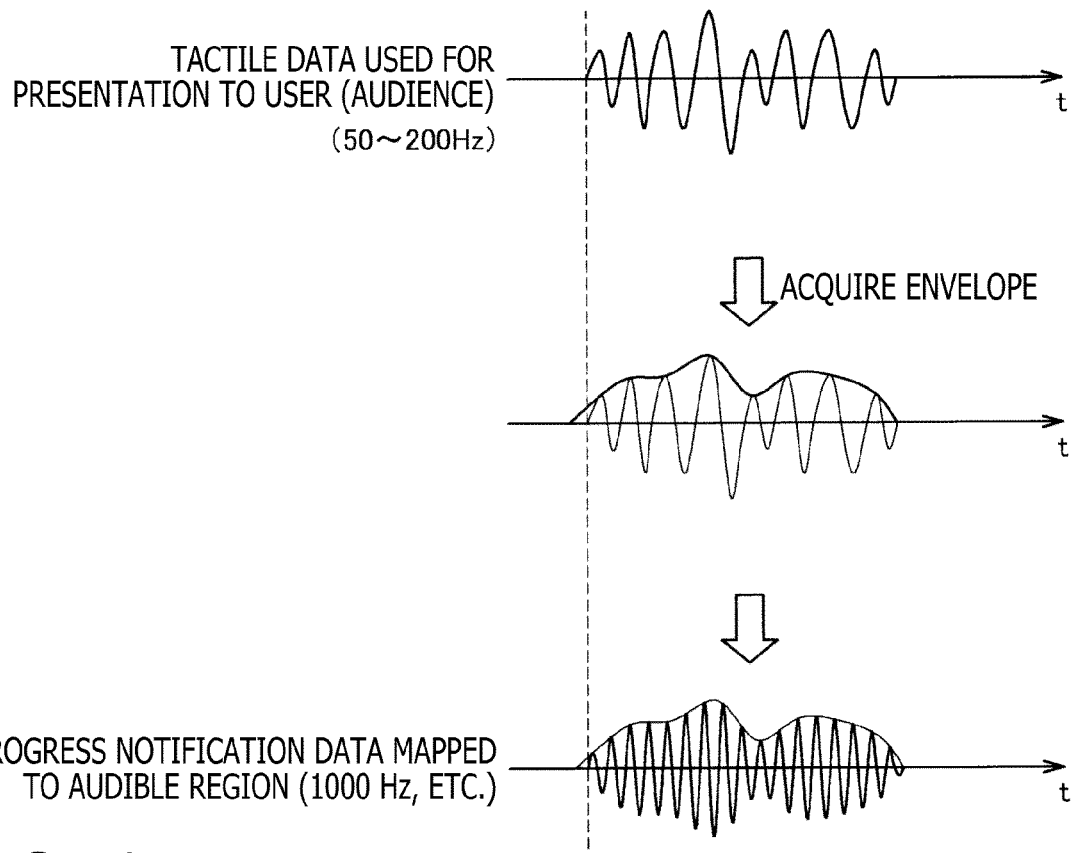
TACTILE DATA USED FOR PRESENTATION TO USER (AUDIENCE) (50~200Hz)
⬇ ACQUIRE ENVELOPE
PROGRESS NOTIFICATION DATA MAPPED TO AUDIBLE REGION (1000 Hz, ETC.)
FIG.15
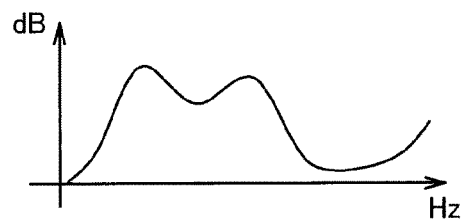
FREQUENCY CHARACTERISTIC OF BGM
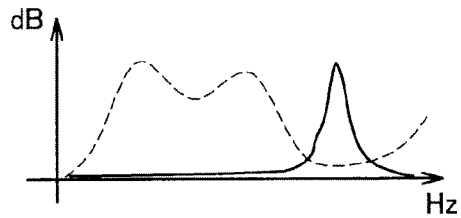
FREQUENCY CHARACTERISTIC OF SOUND PRESENTED BY DIRECTIONAL SPEAKER FIG. 19
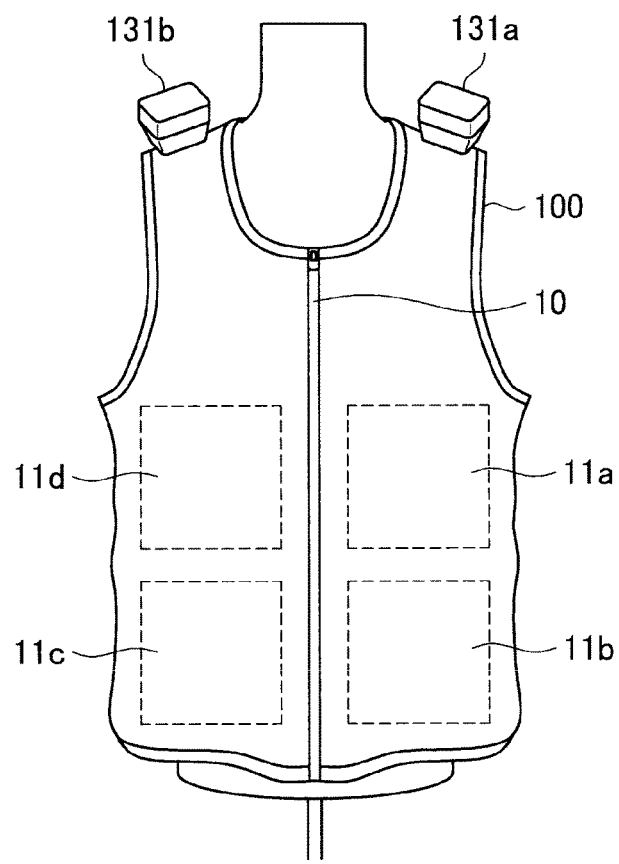
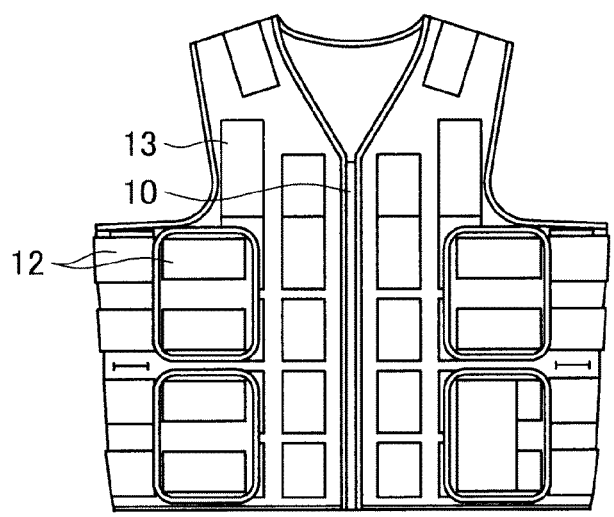
FIG. 20A
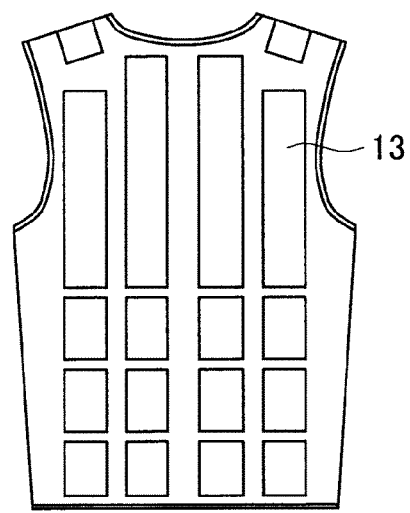
FIG. 20B

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/025275 filed on Jul. 3, 2018, which claims priority benefit of U.S. Provisional Application No. 62/534,879 filed in the US Patent Office on Jul. 20, 2017 and also claims priority benefit of U.S. Provisional Application No. 62/530,455 filed in the US Patent Office on Jul. 10, 2017. Each of the above-referenced applications is hereby incorporated herein by reference in its entirety.

TECHNICAL FIELD

The present disclosure relates to an information processing device, an information processing method, and a program.

BACKGROUND ART

In the past, various technologies for presenting a tactile stimulus or the like to a user have been proposed, for example, as in PTL 1 specified below.

CITATION LIST

Patent Literature

[PTL 1]
    JP 2018-60313A

SUMMARY

Technical Problem

Here, sound outputted from an acoustic presentation section (speaker or the like) is sometimes presented to a user together with various sensations such as a tactile stimulus. For example, upon theater-going, watching of a movie or the like, a case in which sound outputted from an acoustic presentation section and a tactile stimulus outputted from a sensation presentation section (wear type device including an actuator and so forth) worn by a user are presented both to a user or a like case is applicable. At this time, according to the technology of PTL 1 or the like, presentation of a sensation such as a tactile stimulus has not been performed taking a delay generated before sound outputted from the acoustic presentation section is perceived by the user appropriately into consideration. Accordingly, a displacement occurs between a timing at which sound is perceived by the user and another timing at which a sensation such as a tactile stimulus is perceived by the user.

Therefore, the present disclosure proposes a new and improved information processing device, information processing method, and program that can present a sensation to a user taking a delay generated before sound is perceived by the user appropriately into consideration.

Solution to Problem

According to the present disclosure, there is provided an information processing device including a generation section that generates, on the basis of a difference between a first timing at which a sound is to be outputted from an acoustic presentation section and a second timing at which the sound is to be perceived by a first user, first data to be used for presentation of a sensation to the first user by a sensation presentation section worn by the first user.

Further, according to the present disclosure, there is provided an information processing method executed by a computer, the method including generating, on the basis of a difference between a first timing at which a sound is to be outputted from an acoustic presentation section and a second timing at which the sound is to be perceived by a first user, first data to be used for presentation of a sensation to the first user by a sensation presentation section worn by the first user.

Further, according to the present disclosure, there is provided a program for causing a computer to implement generating, on the basis of a difference between a first timing at which a sound is to be outputted from an acoustic presentation section and a second timing at which the sound is to be perceived by a first user, first data to be used for presentation of a sensation to the first user by a sensation presentation section worn by the first user.

Advantageous Effect of Invention

As described above, with the present disclosure, it is possible to present a sensation to a user taking a delay occurring before sound is perceived by a user appropriately into consideration.

It is to be noted that the effect described above is not necessarily restrictive and some effect described in the present specification or other effects capable of being grasped from the present specification may be exhibited together with or in place of the effect described above.

BRIEF DESCRIPTION OF DRAWINGS

FIGS. 6A, 6B, and 6C are view illustrating a mode of a timing at which a video, a sound, and a sensation are outputted and another timing at which the video, the sound, and the sensation are perceived.

FIG. 14 is a view illustrating a still further mode of the progress notification function.

FIG. 15 is a view illustrating a yet further mode of the progress notification function.

FIG. 19 is a view illustrating an outer vest.

FIGS. 20A and 20B are view illustrating an inner vest.

DESCRIPTION OF EMBODIMENT

In the following, a preferred embodiment of the present disclosure is described with reference to the accompanying drawings. It is to be noted that, in the present specification and the drawings, configurations having substantially same functional configurations are denoted by like reference symbols and overlapping description of them is omitted.

Further, the description is given in the following order.
1. Overview of Information Processing System
2. Example of Functional Configuration of Device
3. Example of Processing Flow of Device
4. Progress Notification Function
5. Sensation Presentation Notification Function by Light
6. Example of Hardware Configuration
7. Remarks <1. Overview of Information Processing System>

First, an overview of an information processing system according to the present disclosure is described.

The information processing system according to the present disclosure presents various sensations to a user. Describing more particularly, as depicted in FIG. 1, the information processing system includes a sensation presentation device 100 that is worn by a user and presents various sensations to the user through the sensation presentation device 100.

Figure 1:
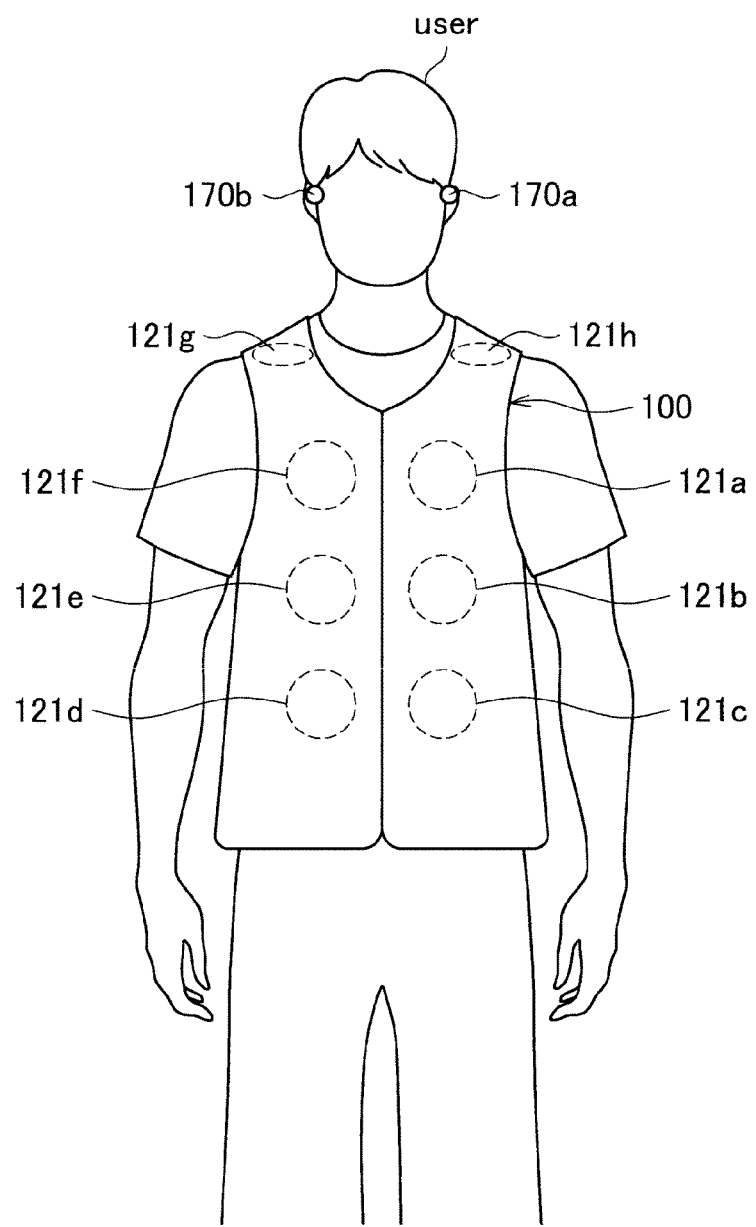
FIG. 1 is a view depicting a particular example of a sensation presentation device 100.

As depicted in FIG. 1, the sensation presentation device 100 includes a plurality of tactile data presentation sections 121 (in FIG. 1, a tactile data presentation section 121a to a tactile data presentation section 121h) provided in the inside thereof. For example, in the inside of the sensation presentation device 100, on a front side of the user, a plurality of tactile data presentation sections 121 (for example, as depicted in FIG. 1, six tactile data presentation sections 121 (tactile data presentation section 121a to tactile data presentation section 121f)) can be deployed; in a shoulder region, a plurality of tactile data presentation sections 121 (for example, as depicted in FIG. 1, one tactile data presentation section 121 on each shoulder (tactile data presentation section 121g and tactile data presentation section 121h)) can be deployed; and on a rear side, a plurality of tactile data presentation sections 121 (not depicted; for example, six tactile data presentation sections 121 similar to those on the front side) can be deployed. As an example, the individual tactile data presentation sections 121 can be deployed in such a positional relationship that the individual tactile data presentation sections 121 deployed on the front side and the individual tactile data presentation sections 121 deployed on the rear side are opposed to each other.

The sensation presentation device 100 includes one or more tactile data presentation sections 121 and can present various tactile stimuli to a user by controlling the magnitude and the timing of outputting of them or a combination of the tactile data presentation sections 121 to be used for outputting. For example, the sensation presentation device 100 can present a sensation that the user is cut, a sensation that the user hits some object, a sensation that the user is held down and so forth. It is to be noted that, while FIG. 1 depicts an example in which the sensation presentation device 100 is a sleeveless garment (vest), the sensation presentation device 100 is not limited to such example and may be able to present a sensation to various regions of the body where it has sleeves, trousers or the like. Further, the number of tactile data presentation sections 121 provided on the sensation presentation device 100 is not limited especially.

Further, as depicted in FIG. 1, a sound collection section 170 such as a microphone provided in the proximity of an ear of the user is provided additionally (in FIG. 1, a sound collection section 170a and a sound collection section 170b) is provided. The sound collection section 170 is a device that is used when a delay that occurs when sound emitted from a predetermined speaker is perceived by the user (such delay is hereinafter referred to sometimes as "acoustic delay") is calculated. Details are hereinafter described.

Figure 2:
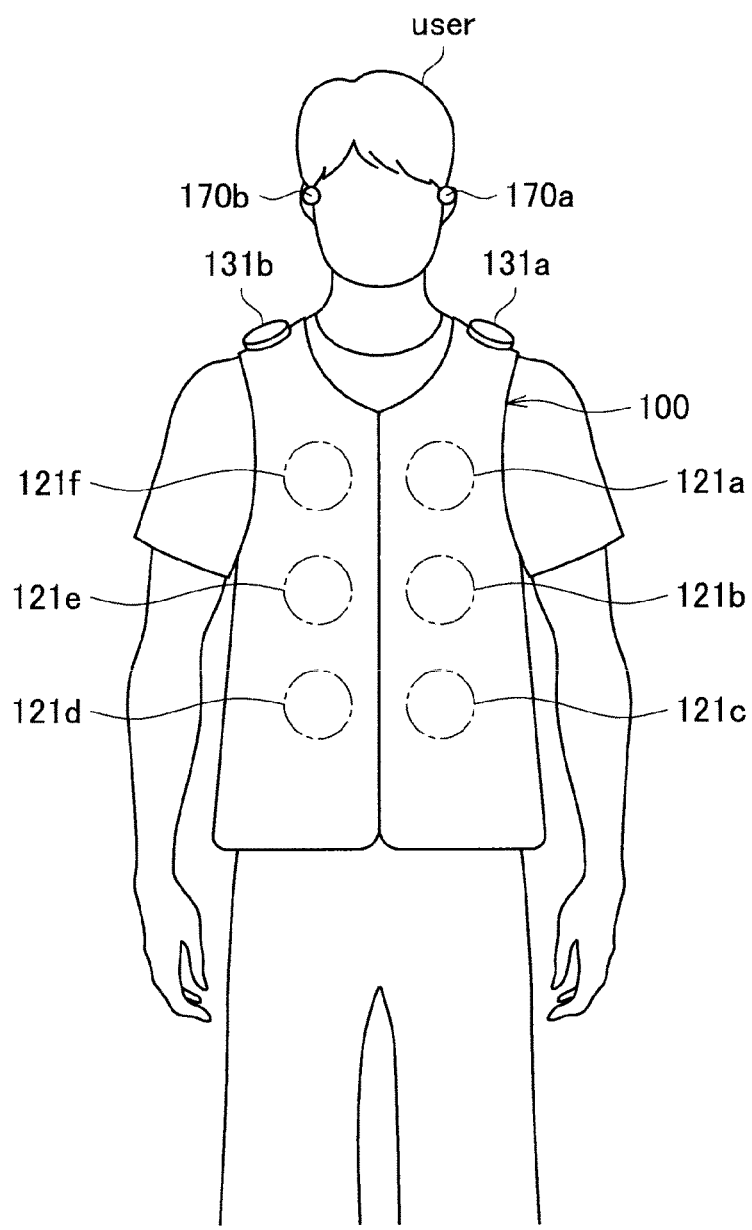
FIG. 2 is a view depicting another particular example of the sensation presentation device 100.

Further, as depicted in FIG. 2, the sensation presentation device 100 may include an acoustic data presentation section 131 that presents sound (in FIG. 2, an acoustic data presentation section 131a and another acoustic data presentation section 131b). For example, in the sensation presentation device 100, a plurality of (for example, one on each shoulder as depicted in FIG. 2) acoustic data presentation sections 131 can be deployed in the shoulder region of the user.

The sensation presentation device 100 includes one or more acoustic data presentation sections 131 and can present various acoustic effects to the user by controlling the magnitude and the timing of an output of them. For example, the sensation presentation device 100 can localize a sound image in the space and can present sound effect only to the user in a situation in which BGM is presented from another speaker (for example, sound effect when the user is cut, sound effect when the user hits some object or the like). It is to be noted that the number of acoustic data presentation sections 131 provided in the sensation presentation device 100 is not limited specifically.

Here, while the examples of FIGS. 1 and 2 depict an example in which sensations to be presented to the user by the sensation presentation device 100 include the tactile (a tactile stimulus presented by the tactile data presentation section 121) and the auditory (sound presented by the acoustic data presentation section 131), the sensations to be presented to the user are not limited to them. More particularly, the sensation presentation device 100 may include a mechanism that can present the visual, olfactory, or taste. For example, the sensation presentation device 100 may be able to present the visual (video) like a transmission type head-mounted display or the like or may present the olfactory (smell) like a fragrance presentation device or the like or else may present the taste (flavor) like an electric taste presentation device.

Figure 3:
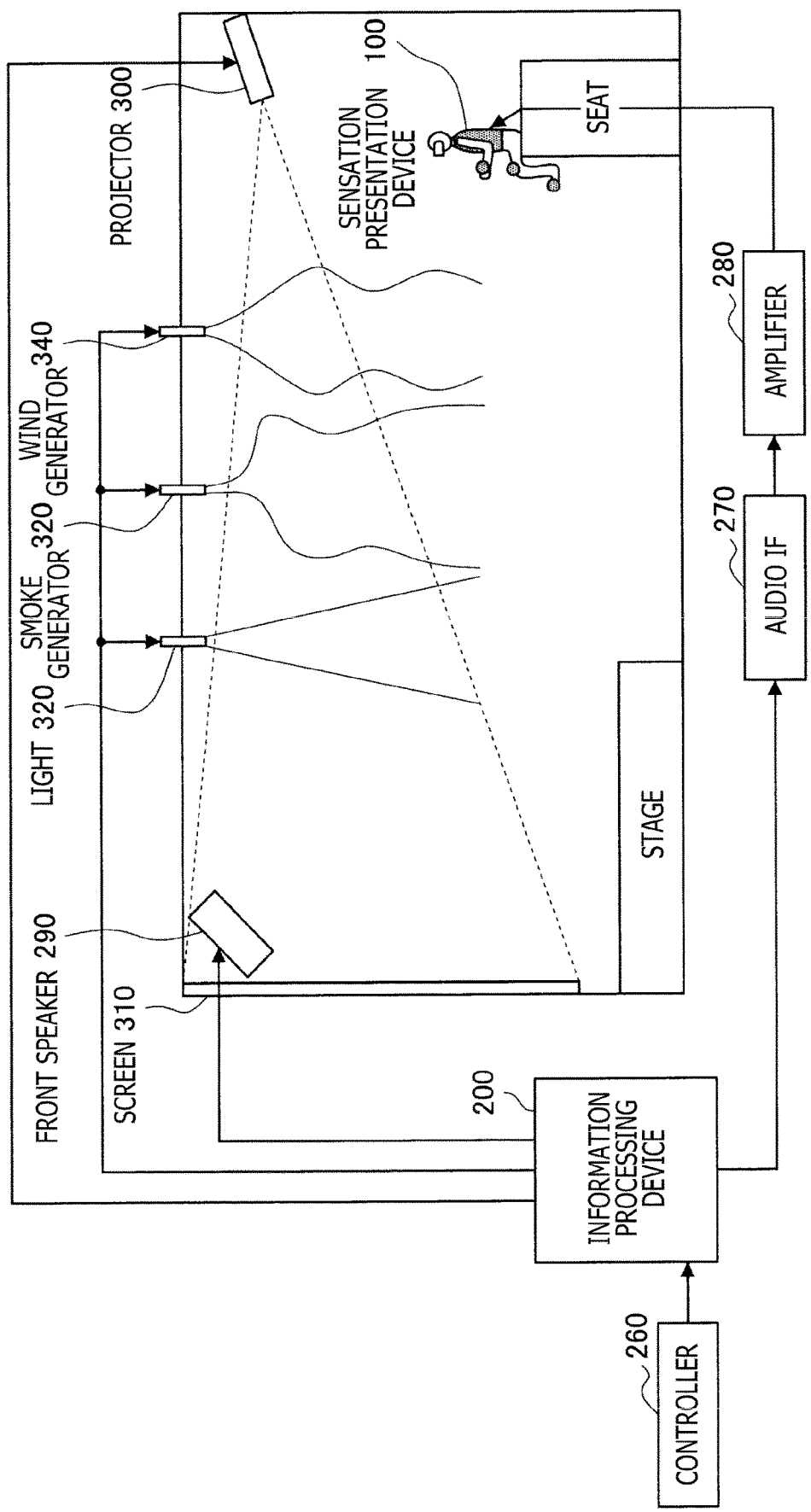
FIG. 3 is a view depicting an example of a configuration of an information processing system according to the present disclosure.

Now, an example of a configuration of an entire system including the sensation presentation device 100 is described with reference to FIG. 3. The information processing system according to the present disclosure is a system that can be utilized, for example, regardless of the indoor (for example, a playhouse, a movie theater, a concert hall, a live house, indoor play facilities in a theme park and so forth) or the outdoor (for example, a playhouse whose stage is provided outdoors, a concert venue or a live venue, a movie screening venue whose screen is provided outdoors, outdoor play facilities in a theme park and so forth). Further, as depicted in FIG. 3, the information processing system according to the present disclosure includes a sensation presentation device 100, an information processing device 200, a controller 260, an audio IF 270, an amplifier 280, a front speaker 290, a projector 300, a screen 310, a light 320, a smoke generator 330, and a wind generator 340 (it is to be noted that the information processing system depicted in FIG. 3 assumes a case in which it is utilized indoors).

A user would wear the sensation presentation device 100 and sit on a seat in a mode in which it can view the screen 310 or a stage. The information processing device 200 is a device that generally controls the entire information processing system. More particularly, the information processing device 200 generally controls a sensation to be presented to a user through the sensation presentation device 100, a video to be projected to the screen 310, a sound to be emitted from the front speaker 290, a light to be irradiated from the light 320, a smoke to be generated from the smoke generator 330, a wind to be generated from the wind generator 340 and so forth. Functions of the information processing device 200 are hereinafter described in detail. The controller 260 is a device that is used when an operator performs inputting to the information processing device 200.

The audio IF 270 is a device that functions as an interface of acoustic data that is used for presentation of sound through the sensation presentation device 100. The amplifier 280 is a device that performs amplification or adjustment of acoustic data inputted to the audio IF 270, switching of an input and so forth. The front speaker 290 is a device that presents sound to a whole venue (in the case where a plurality of users (first users: in the following description, a first user is sometimes referred to merely as "user") exists, to all users).

The projector 300 is a device that projects a video to the screen 310, and the screen 310 is a face (for example, a flat face or a curved face) to which a video is projected. The light 320, the smoke generator 330, and the wind generator 340 are devices that present light, smoke, and wind, respectively.

An example of a configuration of the information processing system according to the present disclosure has been described. It is to be noted that the configuration described above with reference to FIG. 3 is an example to the last, and the configuration of the information processing system according to the present disclosure is not limited to such an example as described above. The configuration of the information processing system according to the present disclosure can be modified flexibly in accordance with specifications or practical use.

Here, as the separation distance between the front speaker 290 and the user increases, an acoustic delay generated until sound outputted from the front speaker 290 is perceived by the user increases. Accordingly, if presentation of sound by the front speaker 290 and presentation of a sensation from the sensation presentation device 100 are performed at a substantially same timing, then the timing at which the sound is perceived by the user later than the timing at which the sensation is perceived.

Figure 4B:
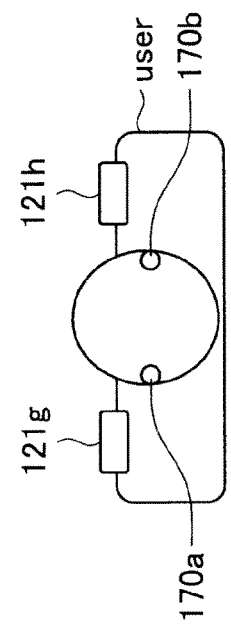
FIGS. 4A and 4B are view illustrating an occurring acoustic delay.
Figure 4A:
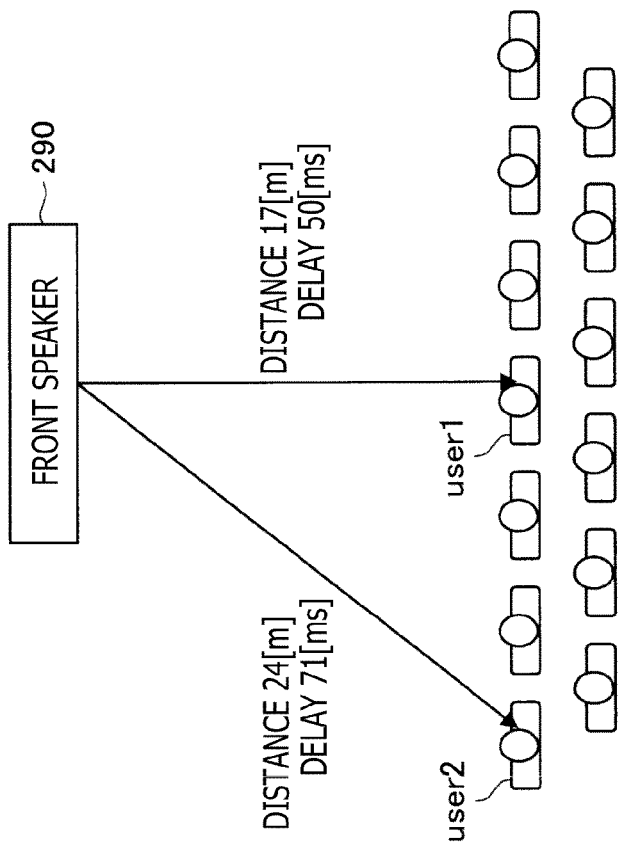

For example, in the case where a user is positioned 17 [m] away from the front speaker 290 as depicted in FIG. 4A (in the figure, the user is denoted by "user1"), if the speed of sound is approximately 340 [m/s], then an acoustic delay of approximately 50 [ms] occurs. Further, in the case where a plurality of users exists, to a user who is positioned 24 [m] away from the front speaker 290 as depicted in FIG. 4A (in the figure, the user is denoted by "user2"), an acoustic delay of approximately 71 [ms] occurs. In such a manner, to each of the users, the magnitude of the acoustic delay (hereinafter referred to sometimes as "acoustic delay amount") differs depending upon the positional relationship of the persons to the front speaker 290.

Figure 5B:
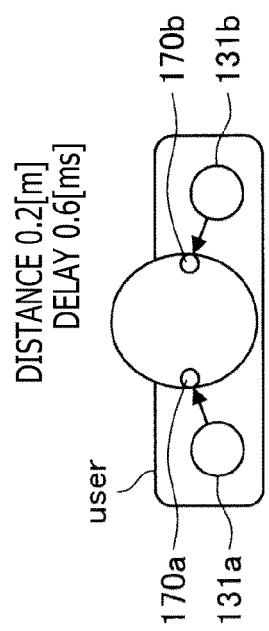
FIGS. 5A and 5B are view illustrating another occurring acoustic delay.
Figure 5A:
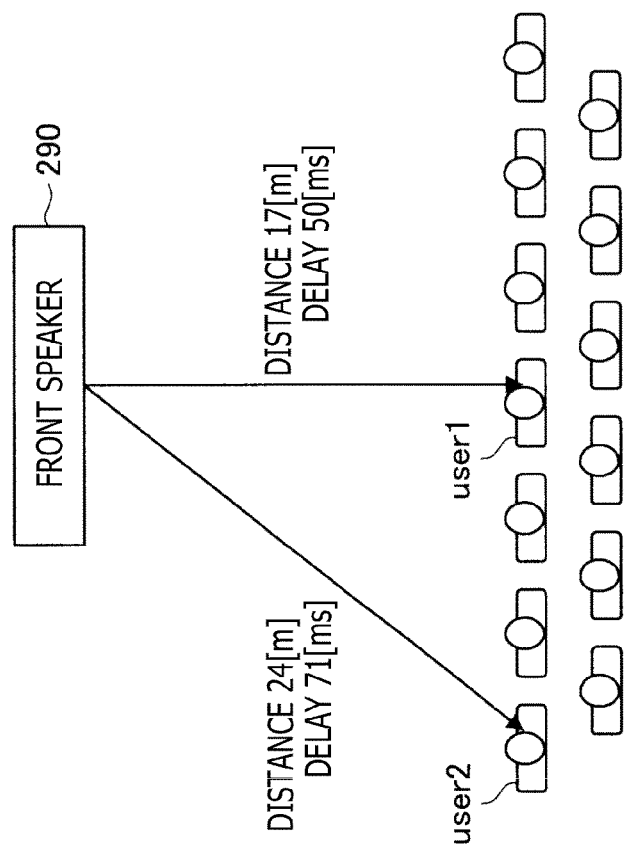

On the other hand, since, different from sound, a tactile stimulus presented, for example, by a tactile data presentation section 121 does not propagate in a medium such as the air FIG. 4B depicts a manner in which the tactile data presentation sections 121 contact closely with the body of the user), little delay occurs until the tactile stimulus is perceived by the user. Also in the case where the sensation presentation device 100 can present a sensation other than a tactile sensation, it can be considered that little delay occurs except a device that presents sound or smell using the air as a medium like an acoustic data presentation section 131 or a fragrance presentation device. Further, in the case where the acoustic data presentation section 131 or the fragrance presentation device is located at a position very close to an ear, the nose or the like of the user, treatment that there is no delay is permissible. This causes the timing at which sound presented from the front speaker 290 is perceived by the user becomes later than the timing at which the sensation is perceived by the user. It is to be noted that, while FIG. 5B depicts that an acoustic delay of approximately 0.6 [ms] occurs until sound presented from an acoustic data presentation section 131 is perceived by the user, even if the acoustic delay is taken into consideration, the acoustic delay amount of sound presented from the front speaker 290 is considerably greater than the acoustic delay amount of sound presented from the acoustic data presentation section 131.

The discloser of the present case came to create the technology relating to the present disclosure taking the situation described above into consideration. The information processing device 200 according to the present disclosure generates, on the basis of the difference (acoustic delay amount) between a first timing at which sound is outputted from an acoustic presentation section (front speaker 290) and a second timing at which a first user (audience) perceives the sound, first data to be used for presentation of a sensation to the first user by a sensation presentation section (sensation presentation device 100) worn by the first user.

Then, the information processing device 200 presents a sensation to the first user at a third timing that is determined on the basis of the difference (acoustic delay amount) between the first timing and the second timing. For example, the information processing device 200 presents a sensation to the first user at a timing substantially same as the second timing at which the first user perceives sound (in other words, in this case, the third timing is substantially same as the second timing). By this, the first user can perceive the sound presented from the front speaker 290 and the sensation at a substantially same timing, and therefore, the first user is less likely to feel uncomfortable. It is to be noted that the third timing may not be substantially same as the second timing at which the first user perceives sound. In other words, the information processing device 200 may intentionally displace the second timing at which the first user perceives sound and the third timing at which the user perceives the sensation from each other. In such a manner, the information processing device 200 can flexibly control the third timing at which the first user is to perceive a sensation with respect to the second timing at which the third timing at which the user is to perceive sound.

Describing an implementation method of the function more particularly, the information processing device 200 acquires a timing at which sound is outputted from the front speaker 290 as a first timing. For example, the first timing may be incorporated (programmed) in a content in advance, may be determined in accordance with an input by an operator through the controller 260 or may be determined by a sensed action of a performer or the like.

Then, the information processing device 200 acquires the timing at which the sound outputted from the front speaker 290 is detected by a sound collection section (sound detection section) 170 worn in the proximity of an ear of the user (first user) as a second timing. It is to be noted that, although, in the case where the sound collection section 170 is located very near to an ear hole of the user, the detection timing by the sound collection section 170 may be treated as the second timing in such a manner, in the case where the sound collection section 170 is spaced by a considerable distance from the ear hole (several tens [cm] or the like), the information processing device 200 may calculate the second timing taking also the separation distance into consideration.

Thereafter, the information processing device 200 calculates the difference (acoustic delay amount) between the first timing and the second timing. Then, the information processing device 200 presents a sensation, which has been scheduled to present at the same time with the first timing at which a sound is to be outputted from the front speaker 290, at a timing basically delayed by the acoustic delay amount from the first timing (in order words, at a timing substantially same as the second timing). It is to be noted that the description of the "sensation, which has been scheduled to represent at the same time as the first timing" is an example to the last, and the presentation timing of a sensation may not necessarily be scheduled in advance.

It is to be noted that, although, in the present specification, principally a case in which each user sits on a seat and the acoustic delay amount in regard to each user does not change is described as an example, the acoustic delay amount to each user may change. For example, the acoustic delay amount in regard to each user may change by movement of at least one of the user or the front speaker 290. It is to be noted that, in the case where the acoustic delay amount in regard to each user does not change, the information processing device 200 can implement the function described above measuring the acoustic delay amount in regard to each seat once in advance (for example, before the performance or the like). On the other hand, in the case where the acoustic delay amount in regard to each user changes, the information processing device 200 can implement the function described above by measuring the acoustic delay amount as needed or every time the user or the front speaker 290 moves.

Here, a mode of timings at which a video, a sound, and a sensation (in FIGS. 6A, 6B, and 6C, a tactile stimulus) from the projector 300, the front speaker 290, and the sensation presentation device 100 are outputted, respectively, and timings at which they are perceived is described taking FIGS. 6A, 6B, and 6C as an example. It is to be noted that the "time code" in FIGS. 6A, 6B, and 6C are intervals of time used for management of a content to be provided to the user and indicates a part when one second is divided into 24 parts (it is to be noted that this is not restrictive). FIG. 6A depicts an example of a case in which a video, a sound, and a tactile stimulus are programmed so as to be perceived all at a substantially same timing. For example, a case in which the information processing device 200 measures the acoustic delay amount in regard to each seat once in advance and reflects the acoustic delay amount on a content or a like case corresponds to the example of FIG. 6A. Since all perception timings of the video, the sound, and the tactile stimulus are substantially same, the user can appreciate (enjoy) them almost without feeling discomfort.

FIG. 6B depicts an example of a case in which a video, a sound, and a tactile stimulus are programmed such that the video is perceived first and then the sound and the tactile stimulus are perceived at a substantially same timing. Although FIGS. 6A, 6B, and 6C depict a case in which a "video" is presented, for example, even if, in the case where not a video but a performance by a performer is performed, an action of the performer is performed not at a fully same timing as that of the sound and tactile stimulus, if the sound and the tactile stimulus are perceived at a substantially same timing, then the user does not feel significant discomfort.

FIG. 6C depicts an example of a case in which the information processing device 200 controls the timing at which a tactile stimulus is to be presented on the basis of an acoustic delay amount. For example, in a case in which the acoustic delay amount changes by a movement of the user or the front speaker 290 or the like, in another case in which an acoustic delay amount cannot be reflected on a content in advance or in a like case, a case in which the information processing device 200 controls the timing of presentation of a tactile stimulus every time of the presentation or a like corresponds to the example of FIG. 6C.

One of the points of the present disclosure is that the timings at which sound and a sensation are perceived by the user are controlled (especially, adjusted to a substantially same timing) as depicted in FIGS. 6A, 6B, and 6C. It is to be noted that also the timing at which the video is to be perceived by the user may be controlled together (for example, also the video may be controlled such that it is perceived at a substantially same timing as that of the sound and the sensation as depicted FIG. 6A). For example, in the case where not the projector 300 and the screen 310 but a display for exclusive use for each user (for example, a shielded type head-mounted display or the like) is provided, the information processing device 200 may control the presentation timings of a video, a sound, and a sensation for each user.

As described above, the information processing device 200 presents a sensation, which has been scheduled to present simultaneously with the first timing at which a sound is to be outputted from the front speaker 290, basically at a timing delayed by an acoustic delay amount from the first timing (in order words, at a timing substantially same as the second timing).

Figure 7C:
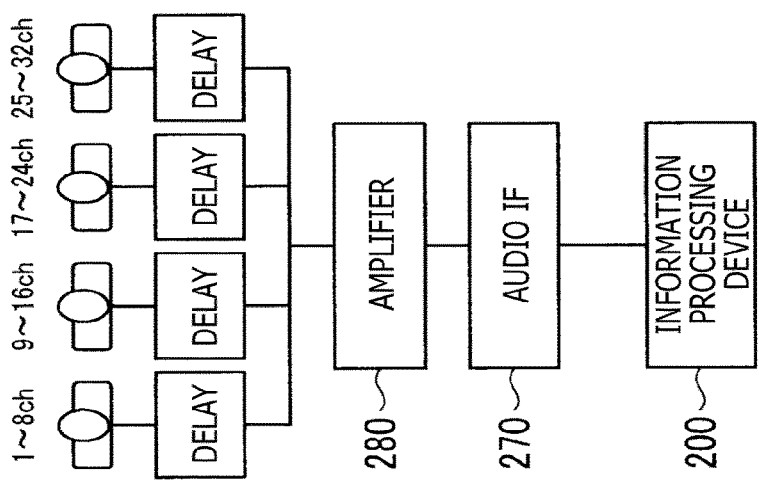
FIGS. 7A, 7B, and 7C are view illustrating a mode in which presentation of a sensation is delayed by an acoustic delay amount.
Figure 7B:
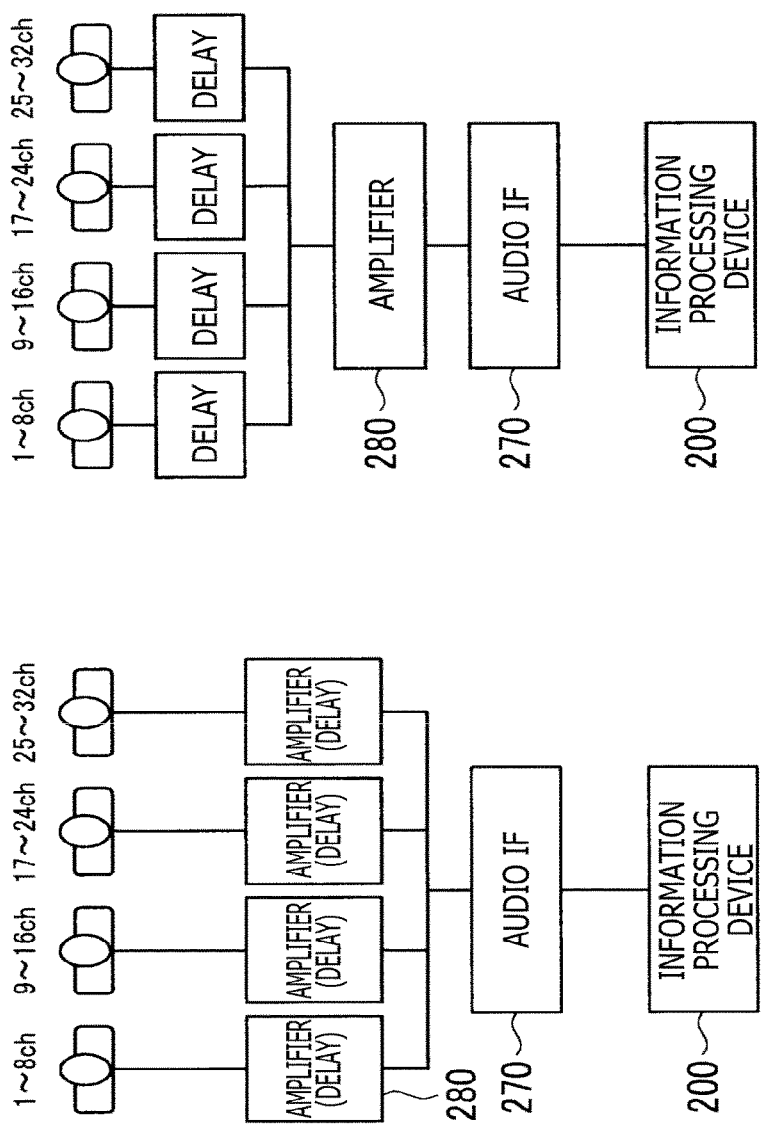
Figure 7A:
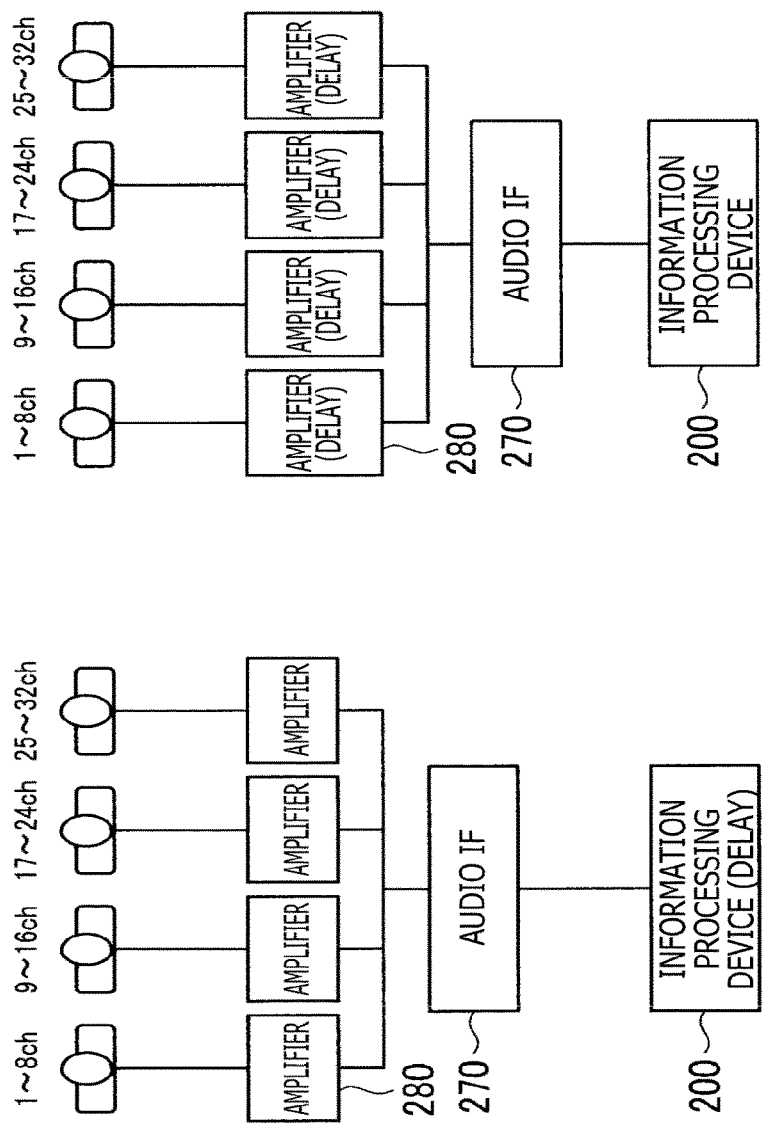

Here, variations of the mode in which presentation of a sensation is delayed by an acoustic delay amount are described with reference to FIGS. 7A, 7B, and 7C. FIGS. 7A, 7B, and 7C depict variations of the mode in which presentation of sound by the acoustic data presentation section 131 is delayed by an acoustic delay amount.

Describing more particularly, FIG. 7A depicts a method by which the information processing device 200 allocates different channels to different users and generates acoustic data (first data) at the top of which a silence period corresponding to the acoustic delay amount is inserted. Thus, the acoustic data is supplied to the sensation presentation device 100 through the audio IF 270 and the amplifier 280 such that the presentation timing of sound by the acoustic data presentation section 131 is controlled for each user (in other words, presentation of a sensation is performed for each first user). It is to be noted that, in the case where a plurality of users who is regarded as having acoustic delay amounts substantially same as each other exist, the information processing device 200 may generate the acoustic data described above for each group of the users (in other words, presentation of a sensation may be performed for each group of first users). Where the information processing device 200 generally generates acoustic data to be provided to each user in such a manner, functions of other devices (for example, the amplifier 280, the sensation presentation device 100 and so forth) can be simplified, and therefore, it is possible to reduce the implementation cost of the overall information processing system.

FIG. 7B depicts a method by which the information processing device 200 allocates a same audio channel to all users and a delay circuit is provided in the amplifier 280 corresponding to each user such that the information processing device 200 sets delay amounts of the delay circuits to values different from each other. For example, the information processing device 200 changes a parameter of the delay circuits to control the delay amount of the delay circuits. Also in this example, the information processing device 200 may control the delay amount of the control circuit for each group of users.

FIG. 7C depicts a method by which the information processing device 200 allocates a same audio channel to all user and a delay circuit is provided in the sensation presentation device 100 to be worn by each user such that the information processing device 200 sets the delay amounts for the delay circuits to values different from each other. For example, similarly as FIG. 7B, the information processing device 200 changes a parameter of the delay circuits to control the delay amounts of the delay circuits. Also in this example, the information processing device 200 may control the delay amount of the delay circuit for each group of users.

It is considered that FIG. 7B is ready more flexibly than FIG. 7A, and FIG. 7C is ready more flexibly than FIGS. 7B and 7A. For example, in the case of FIG. 7C, even in the case where the acoustic delay amount changes every moment, the presentation timing of a sensation can be controlled on the basis of the acoustic delay amount immediately before presentation of the sensation. In other words, the mode most preferable from the experience of a user is FIG. 7C.

Although the examples depicted in FIGS. 7A, 7B, and 7C are directed to a case in which sound is presented by the acoustic data presentation section 131, a similar way of thinking to that of FIGS. 7A, 7B, and 7C is applicable to a case in which a sensation other than a tactile sensation (sound) is presented. For example, also in the case where a tactile stimulus is presented, the presentation timing can be delayed by the information processing device 200, a relaying device (for example, a device corresponding to the amplifier 280), the sensation presentation device 100 or the like.

It is to be noted that, although the present specification mainly describes an example of a case in which FIG. 7A indicating the most basic mode is implemented, it is a matter of design which one of the modes of FIGS. 7A, 7B, and 7C is applied to implement the present disclosure. In other words, the present disclosure may be implemented by any of the modes of FIGS. 7A, 7B, and 7C or may be implemented by a mode other than those of FIGS. 7A, 7B, and 7C. Further, attention is to be paid to that, while the information processing device 200 generates first data to be used for presentation of a sensation to a user on the basis of an acoustic delay amount as described hereinabove, it can be considered that, also in the modes of FIGS. 7B and 7C (or other than those of FIGS. 7A, 7B, and 7C), the "information processing device 200 generates first data to be used for presentation of a sensation to a user on the basis of an acoustic delay amount."

Describing more particularly, that the information processing device 200 controls the delay amount by changing a parameter of a delay circuit provided in the amplifier 280 or the sensation presentation device 100 to control the delay amount for first data (for example, acoustic data or the like) is equivalent to that the "information processing device 200 generates first data to be used for presentation of a sensation to a user on the basis of the acoustic delay amount." Further, the functional configurations of the information processing device 200 hereinafter described need not necessarily be provided in the information processing device 200 and may be provided in another device (for example, the amplifier 280, the sensation presentation device 100 or the like). Accordingly, even if the information processing device 200 cannot change the delay amount of the delay circuit, if the delay amount of the delay circuit of the amplifier 280 or the sensation presentation device 100 can be controlled by some method, then it is considered that this is equivalent to that the "information processing device 200 generates first data to be used for presentation of a sensation to a user on the basis of an acoustic delay amount."

<2. Example of Functional Configuration of Device>

The foregoing description is directed to an overview of the information processing system according to the present disclosure. Now, an example of a functional configuration of the information processing device 200 and the sensation presentation device 100 in the information processing system according to the present disclosure is described with reference to FIGS. 8 and 9.

(2.1. Example of Functional Configuration of Information Processing Device 200)

Figure 8:
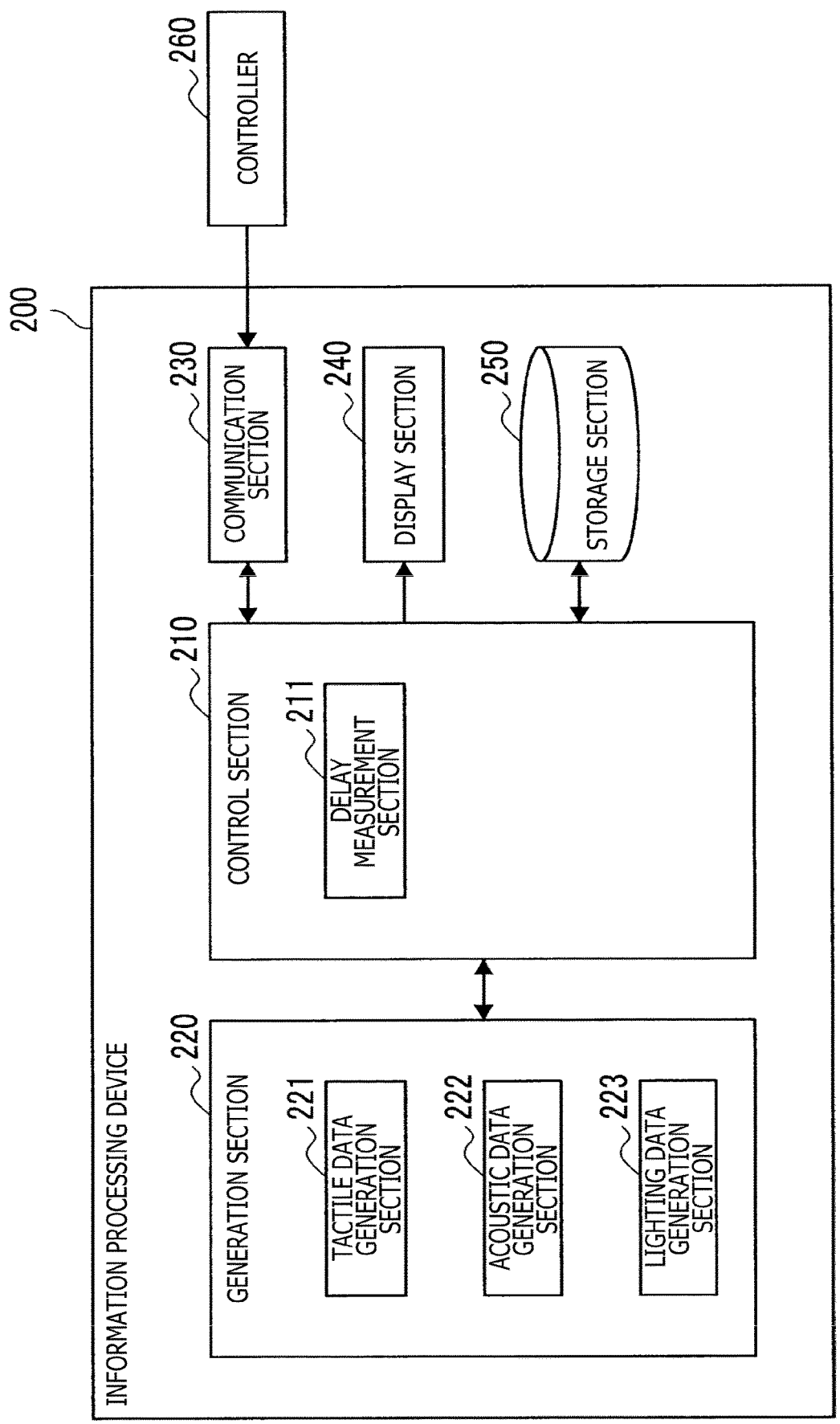
FIG. 8 is a block diagram depicting an example of a functional configuration of an information processing device 200.

First, an example of a functional configuration of the information processing device 200 is described with reference to FIG. 8. As depicted in FIG. 8, the information processing device 200 includes a control section 210, a generation section 220, a communication section 230, a display section 240, and a storage section 250 and is connected to an external controller 260 through the communication section 230.

(Control Section 210)

The control section 210 is a functional configuration that generally controls the functional configurations of the information processing device 200. For example, the control section 210 can control starting and stopping of the functional configurations on the basis of inputting using the controller 260 and progress contents determined in advance and designate contents of a sensation to be presented to a user by the sensation presentation device 100 (for example, contents, timing, strength and so forth of a tactile stimulus to be presented by the tactile data presentation section 121, contents, timing, and volume of sound to be presented by the acoustic data presentation section 131, and so forth). Further, the control section 210 can control devices other than the information processing device 200 in the information processing system by generating various control signals. For example, since the control section 210 can perform change of parameters for such devices, for example, in the case where presentation of sensations is performed, for example, by the mode of FIG. 7B or 7C, the control section 210 can perform change of the delay amount of a delay circuit provided in the amplifier 280 or the sensation presentation device 100 and so forth. It is to be noted that contents of control of the control section 210 are not limited to them. For example, the control section 210 may implement processes performed generally by a computer for universal use, a PC (Personal Computer), a tablet PC, a smartphone and so forth (for example, processes of an OS (Operating System) and so forth). Further, as depicted in FIG. 8, the control section 210 includes a delay measurement section 211.

(Delay Measurement Section 211)

The delay measurement section 211 is a functional configuration for measuring an acoustic delay amount regarding each user. Describing more particularly, the delay measurement section 211 acquires a timing at which a sound is to be outputted from the front speaker 290 as a first timing. As described hereinabove, the first timing may be incorporated in a content in advance (may be programmed) or may be determined by an input by an operator through the controller 260 or else may be determined by sensing of an action of a performer or the like, and the delay measurement section 211 acquires a first timing by a method according to each mode. For example, in the case where the first timing is incorporated in a content in advance, the delay measurement section 211 acquires the first timing by acquiring a parameter of the content from the control section 210, the storage section 250 or the like.

Then, the delay measurement section 211 acquires a timing at which sound outputted from the front speaker 290 is detected by the sound collection section 170 provided in the proximity of an ear of the user as a second timing. For example, the delay measurement section 211 acquires the second timing from each sensation presentation device 100 through the communication section 230.

Thereafter, the delay measurement section 211 calculates an acoustic delay amount by calculating a difference between the first timing and the second timing. The delay measurement section 211 implements generation of data taking the acoustic delay amount by the generation section 220 into consideration by providing the acoustic delay amount to the generation section 220 at the succeeding stage.

It is to be noted that the delay measurement section 211 may calculate the acoustic delay amount by a method other than the method described above. For example, the delay measurement section 211 may estimate an acoustic delay amount on the basis of a positional relationship between the front speaker 290 and the user (first user). Describing more particularly, the delay measurement section 211 acquires data that associate with positions (an arbitrary number of points) in a venue in which the present information processing device is used and acoustic delay amounts at the positions with each other. Then, the delay measurement section 211 may compare the data and a position of a user specified using sensor data of the sensors that can be used for position specification of the users (for example, the sensor provided in the sensation presentation device 100) to estimate the acoustic delay amount at the position of the user.

(Generation Section 220)

The generation section 220 is a functional configuration for generating various data to be used by the information processing system. More particularly, the generation section 220 is a functional configuration that generates data to be used for presentation of a tactile stimulus, a sound, a light, a video, a smoke, and a wind. It is to be noted that generation of data to be used for presentation of a tactile stimulus, a sound and, a light is hereinafter described. The generation section 220 generates data to be used for presentation of a video, a smoke, and a wind at any time under the control of the control section 210 and provides the generated data to the individual devices through the network to which the projector 300, the smoke generator 330, and the wind generator 340 are connected. As depicted in FIG. 8, the generation section 220 includes a tactile data generation section 221, an acoustic data generation section 222, and a lighting data generation section 223.

(Tactile Data Generation Section 221)

The tactile data generation section 221 is a functional configuration for generating tactile data to be used for presentation of a tactile stimulus by the sensation presentation device 100 on the basis of an acoustic delay amount measured by the delay measurement section 211. For example, the tactile data generation section 221 first decides whether or not the acoustic delay amount is equal to or higher than a predetermined threshold value. It is to be noted that the setting method the predetermined threshold value is not restricted specifically, and for example, the predetermined threshold value can be set by an input by an operator. Then, in the case where the acoustic delay amount is equal to or higher than the predetermined threshold value, the tactile data generation section 221 may generate tactile data at the top of which a blank interval corresponding to the acoustic delay amount (interval in which a tactile stimulus is not presented) is inserted to delay the presentation timing of the tactile stimulus or may delay the timing itself for generating tactile data by the acoustic delay amount to delay the presentation timing of the tactile stimulus. It is to be noted that any other method than the method described above may be used if it is possible to delay the presentation timing of a tactile stimulus by an acoustic delay amount.

(Acoustic Data Generation Section 222)

The acoustic data generation section 222 is a functional configuration for generating acoustic data to be used for presentation of sound by the front speaker 290 and the acoustic data presentation section 131 of the sensation presentation device 100. For example, the acoustic data generation section 222 acquires a first timing, generates acoustic data such that sound is outputted from the front speaker 290 at the first timing, and provides the acoustic data to the front speaker 290 through a predetermined network.

A provision process of acoustic data to the sensation presentation device 100 is described. For example, the acoustic data generation section 222 decides whether or not the acoustic delay amount is equal to or greater than a predetermined threshold value. It is to be noted that the setting method of the predetermined threshold value is not restricted especially, and for example, the predetermined threshold value can be set by an input by an operator (further, the threshold value may be different from the threshold value described above used by the tactile data generation section 221). Then, in the case where the acoustic delay amount is equal to or greater than the predetermined threshold value, the acoustic data generation section 222 may generate acoustic data at the top of which a silence interval corresponding to the acoustic delay amount from the front speaker 290 is inserted to delay the presentation timing of sound by the acoustic data presentation section 131, or may delay the timing itself for generation of acoustic data by the acoustic delay amount to delay the presentation timing of sound. It is to be noted that any other method than the method described above may be used if it is possible to delay the presentation timing of sound by the acoustic delay amount.

(Lighting Data Generation Section 223)

The lighting data generation section 223 is a functional configuration for generating lighting data to be used for presentation of light (lighting) by the light 320 under the control of the control section 210. The lighting data generation section 223 provides the generated data to the light 320 through a predetermined network. It is to be noted that, in the information processing system according to the present disclosure, the lighting data generation section 223 can implement the function of irradiating data upon each user at a timing at which presentation of a sensation is to be performed for the user. Details of the function are hereinafter described.

(Communication Section 230)

The communication section 230 is a functional configuration for performing communication with an external apparatus. For example, in the case where an operator of the information processing device 200 performs inputting using the controller 260, the communication section 230 receives the input data from the controller 260 and provides the input data to the control section 210 to implement reflection of the input by the operator. Further, the communication section 230 transmits data generated by the generation section 220 (including, for example, tactile data, acoustic data and so forth) to a predetermined external apparatus to implement presentation of a tactile stimulus, a sound, a video, a lighting, a smoke, a wind and so forth. It is to be noted that the data communicated by the communication section 230 are not limited to them. For example, the communication section 230 may receive data relating to the second timing, at which the sound outputted from the front speaker 290 is detected by the sound collection section 170, from the sensation presentation device 100 or may transmit data relating to parameters for changing the delay amount of the delay circuit provided in the amplifier 280 or the sensation presentation device 100 to such device. Further, the types of the communication method and the communication line to be used for communication between the communication section 230 and respective external apparatuses are not restricted specifically. For example, the communication section 230 may perform communication by wired communication or by wireless communication with the respective external apparatuses.

(Display Section 240)

The display section 240 is a functional configuration for displaying a setting screen image to be used for inputting by an operator and so forth. The display section 240 may be a display device such as, for example, a liquid crystal display (LCD: Liquid Crystal Display) or an organic EL (Electro Luminescence) display. It is to be noted that the type and display contents of the display section 240 are not limited to them.

(Storage Section 250)

The storage section 250 is a functional configuration for storing various data. For example, the storage section 250 stores programs and parameters to be used by the functional configurations of the information processing device 200, data generated by the functional configurations (for example, tactile data, acoustic data, lighting data and so forth) and so forth. It is to be noted that contents of the data to be stored into the storage section 250 are not limited to them.

(Controller 260)

The controller 260 is a device for receiving an input by an operator and providing input data to the information processing device 200. The controller 260 includes various inputting mechanisms such as a keyboard, a mouse, buttons, switches, levers, touch sensors, pressure sensors, or proximity sensors. It is to be noted that the types of inputting mechanisms provided in the controller 260 are not limited to them. Further, the controller 260 may not be provided as an external apparatus of the information processing device 200 but may be provided in the information processing device 200.

The example of a functional configuration of the information processing device 200 and the controller 260 have been described. It is to be noted that the functional configuration described above with reference to FIG. 8 is an example to the last, and the functional configuration of the information processing device 200 is not limited to such example. For example, the information processing device 200 may not necessarily include all of the functional configurations depicted in FIG. 8. Further, the functional configuration of the information processing device 200 can be modified flexibly in accordance with the specification or practical use.

(2.2. Example of Functional Configuration of Sensation Presentation Device 100)

Figure 9:
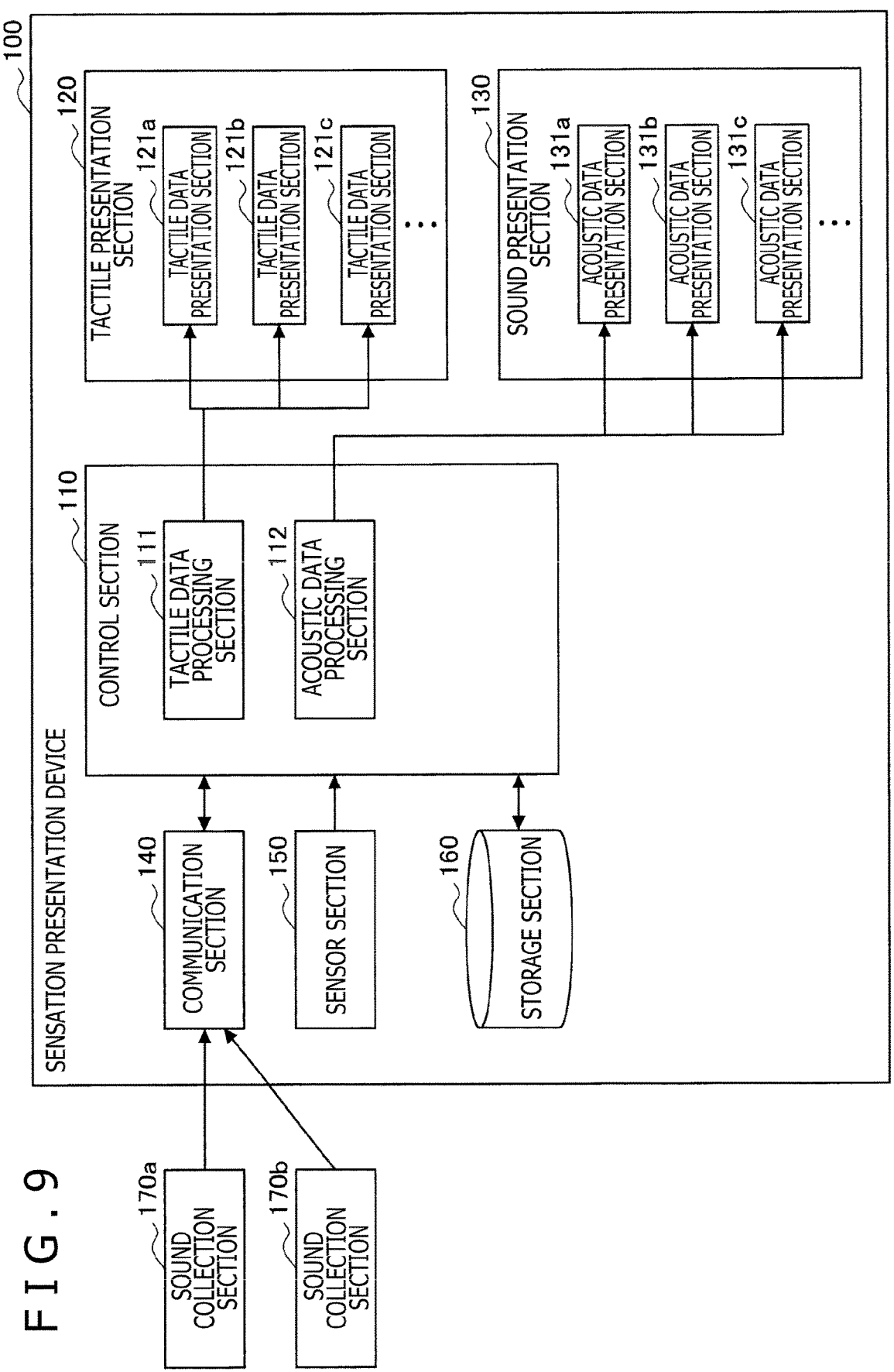
FIG. 9 is a block diagram depicting an example of a functional configuration of the sensation presentation device 100.

The foregoing description is directed to an example of a functional configuration of the information processing device 200. Now, an example of a functional configuration of the sensation presentation device 100 is described with reference to FIG. 9. As depicted in FIG. 9, the sensation presentation device 100 includes a control section 110, a tactile presentation section 120, a sound presentation section 130, a communication section 140, a sensor section 150, and a storage section 160 and is connected to an external sound collection section 170 (in FIG. 9, to the sound collection section 170a and the sound collection section 170b) through the communication section 140.

(Control Section 110)

The control section 110 is a functional configuration that generally controls the functional configurations of the sensation presentation device 100. For example, the control section 110 controls starting and stopping of the functional configurations on the basis of various data (including, for example, tactile data, acoustic data, other control signals and so forth) provided from the information processing device 200. Further, the control section 110 provides data relating to a second timing, at which sound outputted from the front speaker 290 is detected by the sound collection section 170, to the information processing device 200 through the communication section 140. For example, the control section 110 may implement processes that are generally performed in a computer for universal use, a PC, a tablet PC, a smartphone and so forth (for example, processes of an OS or the like). Further, as depicted in FIG. 9, the control section 110 includes a tactile data processing section 111 and an acoustic data processing section 112.

(Tactile Data Processing Section 111)

The tactile data processing section 111 performs a process relating to presentation of a tactile stimulus by the tactile data presentation section 121 using tactile data provided from the information processing device 200. For example, the tactile data processing section 111 may implement presentation of a tactile stimulus by editing, on the basis of settings of the individual sensation presentation device 100 (for example, settings of the sensation presentation device 100 performed uniquely by a user (for example, setting of a volume, setting of ON/OFF of the function and so forth)), tactile data provided from and information processing device 200 and providing the tactile data after the editing to the tactile data presentation section 121.

Further, the tactile data processing section 111 may have the delay circuit described hereinabove provided therein. Thus, the tactile data processing section 111 may change the delay amount by applying a parameter supplied from the information processing device 200 to the delay circuit.

(Acoustic Data Processing Section 112)

The acoustic data processing section 112 performs processes relating to presentation of sound by the acoustic data presentation section 131 using acoustic data supplied from the information processing device 200. For example, the acoustic data processing section 112 may implement presentation of sound by editing, on the basis of settings of the individual sensation presentation device 100 (for example, settings of the sensation presentation device 100 performed uniquely by a user (for example, setting of a volume, setting of ON/OFF of the function and so forth)), acoustic data provided from the information processing device 200 and providing the sound data after the editing to the acoustic data presentation section 131.

Further, the acoustic data processing section 112 may include the delay circuit described hereinabove. Thus, the acoustic data processing section 112 may change the delay amount by applying a parameter supplied from the information processing device 200 to the delay circuit.

(Tactile Presentation Section 120)

The tactile presentation section 120 is a functional configuration that includes one or more tactile data presentation sections 121 and presents a tactile stimulus to the user using the tactile data presentation section 121.

(Tactile Data Presentation Section 121)

The tactile data presentation section 121 is a functional configuration for presenting a tactile stimulus to a user using tactile data provided from the tactile data processing section 111. For example, the tactile data presentation section 121 may be an actuator that presents vibration (for example, an ERM (eccentric motor), an LRA (linear resonance actuator), a VCM (voice coil motor) or the like), or may be an electric element that presents a sensation of force or else may be a temperature change element that presents a temperature sensation (for example, a Peltier element or the like). In other words, the "tactile stimulus" can include a vibration, a sensation of force, a temperature sensation and so forth. It is to be noted that the tactile stimulus to be presented by the tactile data presentation section 121 is not limited to them. Further, a channel may be allocated to each of the tactile data presentation sections 121 (in FIG. 9, at least the tactile data presentation section 121a to the tactile data presentation section 121c) such that presentation of a tactile stimulus that is different for each channel is performed.

(Sound Presentation Section 130)

The sound presentation section 130 includes at least one or more acoustic data presentation sections 131 and has a functional configuration that it presents sound to the user using the acoustic data presentation sections 131.

(Acoustic Data Presentation Section 131)

The acoustic data presentation section 131 is a functional configuration that presents sound to the user using acoustic data provided from the acoustic data processing section 112. For example, the acoustic data presentation section 131 can include a speaker for reproducing acoustic data, an amplification circuit for the speaker and so forth. Further, a plurality of acoustic data presentation sections 131 (in FIG. 9, at least the acoustic data presentation section 131a to the acoustic data presentation section 131c) may be provided such that localization of a sound image may be implemented by adjusting outputs of the acoustic data presentation sections 131. At this time, the sound image may be localized by cooperation of the acoustic data presentation sections 131 and speakers provided around them (for example, speakers at the seats). It is to be noted that different channels may be allocated to the individual acoustic data presentation sections 131 such that presentation of sound that is different among the different channels is performed.

(Communication Section 140)

The communication section 140 is a functional configuration that performs communication with an external apparatus. For example, in the case where the sound collection section 170 (in FIG. 9, the sound collection section 170a and the sound collection section 170b) detects sound outputted from the front speaker 290, the communication section 140 performs communication with the sound collection section 170 to receive data relating to the second timing at which sound is detected and transmit the data to the information processing device 200. Further, the communication section 140 receives various data generated by the information processing device 200 (including, for example, tactile data, acoustic data, other control signals and so forth). It is to be noted that the data communicated by the communication section 140 are not limited to them. For example, the communication section 140 may receive data relating to parameters for changing the delay amount of the delay circuit provided in the sensation presentation device 100 from the information processing device 200. Further, the types of the communication method and the communication lines to be used for communication between the communication section 140 and the external apparatus are not restricted specifically. For example, the communication section 140 may perform wired communication with an external apparatus or may perform wireless communication.

(Sensor Section 150)

The sensor section 150 includes various sensors and has a functional configuration for acquiring sensor data generated by the sensors. For example, the sensor section 150 may include a position sensor (a sensor that can be used for specification of the position of a user including, for example, a GNSS (Global Navigation Satellite System) receiver, a proximity sensor and so forth) such that it acquires sensor data to be used for specification of the position of the user. It is to be noted that the type of the sensor provided in the sensor section 150 is not restricted specifically. For example, the sensor section 150 may include various sensors such as a posture sensor (a gyro sensor, an acceleration sensor or the like), a temperature sensor, or a pressure sensor.

(Storage Section 160)

The storage section 160 has a functional configuration for storing various data. For example, the storage section 160 stores programs and parameters to be used by the functional configurations of the sensation presentation device 100, or various data provided from the information processing device 200 (including, for example, tactile data, acoustic data, other control signals and so forth) and so forth. It is to be noted that contents of the data stored in the storage section 160 are not limited to them.

(Sound Collection Section 170)

The sound collection section 170 is a microphone and so forth provided in the proximity of an ear of the user and has a functional configuration for detecting sound to be perceived by the user (for example, sound outputted from the front speaker 290 and so forth). It is to be noted that the sound collection section 170 is not limited to a microphone but may be any device if it is a device that can detect sound.

Further, the sound collection section 170 may not be provided as an external apparatus of the sensation presentation device 100 but may be provided in the sensation presentation device 100.

An example of the functional configuration of the sensation presentation device 100 and the sound collection section 170 have been described above. It is to be noted that the functional configuration described hereinabove with reference to FIG. 9 is an example to the last, and the functional configuration of the sensation presentation device 100 is not limited to such an example as described above. For example, the sensation presentation device 100 may not necessarily include all of the functional configurations depicted in FIG. 9. Further, the functional configuration of the sensation presentation device 100 can be modified flexibly in accordance with specifications or a practical use.

<3. Example of Processing Flow of Device>

Figure 10:
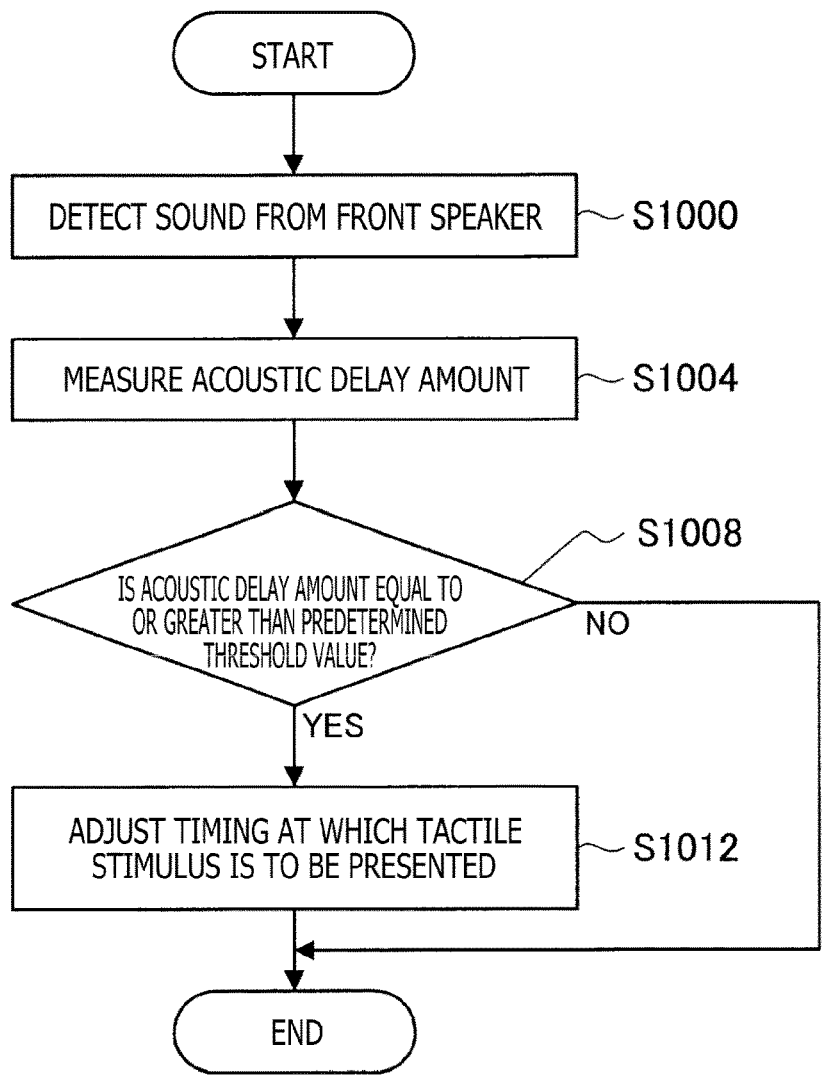
FIG. 10 is a flow chart illustrating an example of a flow of an adjustment process of a presentation timing of a sensation based on the acoustic delay amount.

The foregoing description is directed to an example of a functional configuration of the information processing device 200 and the sensation presentation device 100 in the information processing system according to the present disclosure. Now, an example of a flow of an adjustment process of a presentation timing of a sensation based on an acoustic delay amount is described with reference to FIG. 10. FIG. 10 depicts a flow of processing in the case where, in the case where the acoustic delay amount does not substantially change during provision of a content (in other words, in the case where none of the user and the front speaker 290 moves or in a like case), the presentation timing of a tactile stimulus is adjusted in advance on the basis of the acoustic delay amount.

First at step S1000, the sound collection section 170 provided in the proximity of an ear of the user detects sound from the front speaker 290. At step S1004, the delay measurement section 211 of the information processing device 200 measures the acoustic delay amount. More particularly, the delay measurement section 211 acquires a detection timing of sound by the sound collection section 170 as a second timing from the sensation presentation device 100 and calculates the difference between the first timing and the second timing to measure an acoustic delay amount.

At step S1008, the tactile data generation section 221 decides whether or not the acoustic delay amount is equal to or greater than a predetermined threshold value. In the case where the acoustic delay amount is equal to or greater than the predetermined threshold value (step S1008/Yes), the tactile data generation section 221 adjusts the timing at which a tactile stimulus is to be presented with the tactile data at step S1012. More particularly, the tactile data generation section 221 generates tactile data at the top of which a blank interval corresponding to the acoustic delay amount (interval in which no tactile stimulus is to be presented) is inserted or delays the timing itself, at which tactile data is to be generated, by the acoustic delay amount to adjust (program) the presentation timing of a tactile stimulus, thereby ending the series of processes. In the case where the acoustic delay amount is smaller than the predetermined threshold value (step S1008/No), the processing is ended without performing adjustment of the timing at which a tactile stimulus is to be presented. Thereafter, the content adjusted (programmed) by the processes described above is presented to the user.

Since the sensation presentation device 100 can present, by the processes described above, a sensation (in the example of FIG. 10, a tactile stimulus) to the user at a timing substantially same as that at which sound from the front speaker 290 is perceived by the user, the user can be prevented from feeling discomfort.

It is to be noted that it is supposed that the processes described above are performed for each user (or in the case where a plurality of users who is considered to have acoustic delay amounts substantially equal to each other, for each group of the users) (in other words, it is supposed that presentation of a sensation is performed for each first user or for each group of first users). Further, in the case where the acoustic delay amount changes during provision of a content (in other words, in the case where the user or the front speaker 290 moves or in a like case), the processing flow of FIG. 10 is repeated as needed (for example, repeated at predetermined intervals), by which the presentation timing of a tactile stimulus continues to be adjusted (it is to be noted that, in this case, tactile data is generated at each of the predetermined intervals and continues to be provided until the content comes to an end). Further, at step S1004, the acoustic delay amount may be estimated on the basis of the positional relationship between the front speaker 290 and the user as described above.

<4. Progress Notification Function>

The foregoing description is directed to an adjustment function of a presentation timing of a sensation based on an acoustic delay amount. Here, the information processing system according to the present disclosure can also implement a function other than this function. For example, the information processing system according to the present disclosure can implement a function for notifying a performer who is to do the acting on the stage or the like (second user) of a timing at which a sensation is to be presented to a user (first user) (third timing) (the function is hereinafter referred to sometimes as "progress notification function"). Therefore, the progress notification function is described in the following.

In the case where the present information processing system is used in theatrics and a sensation is presented to a user, the performer is sometimes requested to recognize a timing at which a sensation is to be presented to the user. For example, a case in which, at a timing at which the performer does the acting of cutting the user, a sensation that the user is cut is presented to each user is applicable. In such a case that a timing at which a sensation that the user is cut is to be presented to each user is programmed in advance or in a like case, it is requested to the performer to do the acting of cutting the user at the timing.

Therefore, the information processing system according to the present disclosure can notify the performer or the like of a timing at which the sensation is to be presented to the user. More particularly, the information processing device 200 generates, on the basis of first data to be used for presentation of a sensation to a user (first user), a second data to be used for the notification (hereinafter referred to as "progress notification data"). Then, the information processing device 200 can notify the performer of a third timing by providing the progress notification data to various devices to present the sensation.

Here, although the notification supposes that it is performed at a timing substantially same as a timing (third timing) at which a sensation is to be presented to the user, this is not restrictive. For example, the notification may be performed rather early than the third timing taking a period of time required after the performer perceives a tactile stimulus until the performer actually performs the action (performance). Further, the "second user" to whom the notification is directed is not limited to the performer and can include all users who provide a content (for example, the director, stage staff and so forth).

While usually a performer does the acting in accordance with BGM or sound effect outputted from the front speaker 290, by applying the present disclosure even to a situation in which BGM or sound effect plays, the performer can recognize the timing at which a sensation is to be presented to the user, and therefore, it is considered that it is useful that the present disclosure is applied. Further, even in a situation in which BGM or sound effect plays, the timing at which the performer perceives the BGM or the like and the timing at which each user perceives the BGM or the like differ due to acoustic delay, and therefore, it is considered useful similarly that the present disclosure is applied.

Here, various modes are available as the generation process of progress notification data. In the following, particular examples of a conversion process in the case where a sensation to be presented to a user is a tactile stimulus (generation process of progress notification data) are described with reference to FIGS. 11 to 15.

In the case where a device that can present a sensation to a performer (for example, a device having functions similar to those of the sensation presentation device 100) is provided, the information processing system according to the present disclosure may implement progress notification by presenting a sensation to the performer using the device. In the following description, a case in which the performer wears the sensation presentation device 100 is described as an example (in the following description, a device the performer wears is referred to as "sensation presentation device 100a" and a device a user (audience) wears is referred to as "sensation presentation device 100b"). It is to be noted that, in this case, it is assumed that the sensation presentation device 100a worn by the performer has a form in which it does not impede the acting (for example, a form of a stage costume, a form having such a size that it can be accommodated in a pocket or the like).

Figure 11:
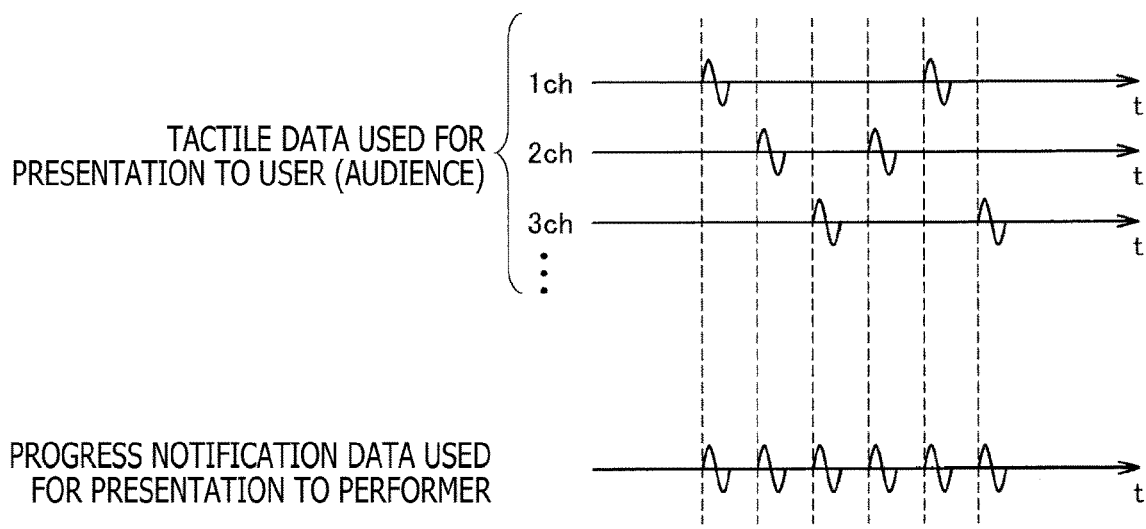
FIG. 11 is a view illustrating a mode of a progress notification function.

Thus, for example, the tactile data generation section 221 of the information processing device 200 integrates tactile data to be used for presentation of a tactile stimulus by each tactile data presentation section 121 of the sensation presentation device 100b worn by the user into one tactile data to generate progress notification data to be presented to the performer by the sensation presentation device 100a. More particularly, in the case where tactile data to be used for presentation of a tactile stimulus to users (audience) are generated over a plurality of channels as depicted in FIG. 11, the tactile data generation section 221 of the information processing device 200 may integrate the channels into one channel while keeping the relationship of timings at which tactile stimuli are to be presented in the individual channels to generate progress notification data. The performer can do the acting appropriately basically only if the performer can recognize a timing at which a sensation is to be presented to a user (for example, a start timing and an end timing of presentation of a tactile stimulus) (for example, contents of the acting can be switched appropriately). Accordingly, it is considered that it is sufficient if the tactile data presentation section 121 presents a tactile stimulus to the performer using progress notification data integrated to one channel. It is to be noted that the foregoing is an example to the last, and the number of channels of progress notification data is not restricted especially.

Figure 12:
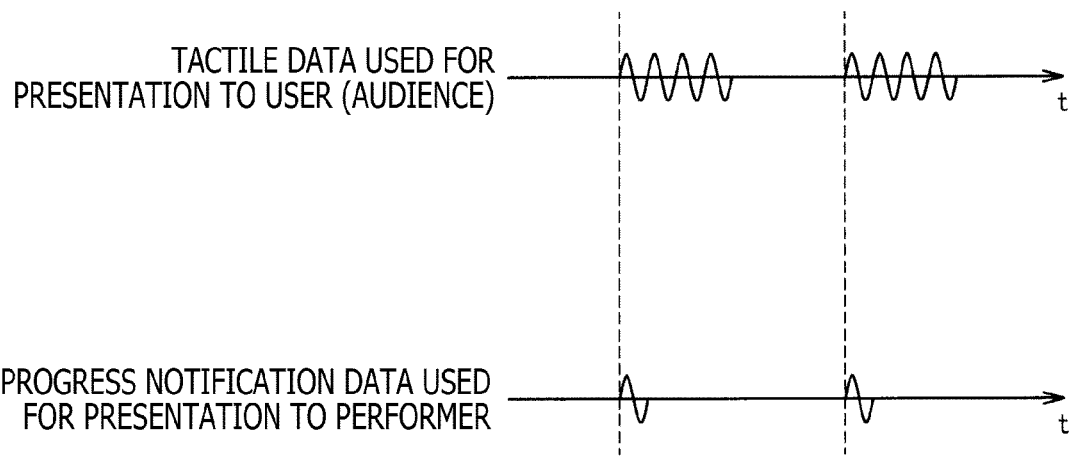
FIG. 12 is a view illustrating another mode of the progress notification function.

Further, in the case where only it is necessary that the performer can recognize a start timing of presentation of a tactile stimulus, as depicted in FIG. 12, the tactile data generation section 221 may extract a waveform at the top portion of tactile data (hereinafter referred to sometimes as "impulse") that is used in the case where a tactile stimulus is presented continuously over a certain period of time and reflect the waveform on the progress notification data. It is to be noted that the tactile data generation section 221 may cause the performer to recognize an end timing of presentation of a tactile stimulus by extracting and reflecting the waveform of a tail portion of tactile data upon progress notification data. It is to be noted that the extraction method of an impulse is not specifically restricted. More particularly, the tactile data generation section 221 can extract an impulse using an arbitrary waveform data analysis method (for example, a method of extracting waveform data at a portion at which the waveform data exceeds a predetermined threshold value within a predetermined interval).

It is to be noted that, although the foregoing description is directed to an example of a case in which the sensation to be presented to a user is a tactile stimulus, processes similar to those described above can be performed also in regard to a case in which the sensation to be presented to a user is a sensation other than the tactile stimulus. Further, at this time, the type or the presentation location (portion) of a sensation to be presented to a user and the type or the presentation location (portion) of a sensation to be presented to the performer may be different from each other. For example, in the case where the sensation to be presented to the user is sound, the sensation to be presented to the performer may be a tactile stimulus.

Further, the information processing device 200 may perform progress notification to the performer using a device other than the sensation presentation device 100a. For example, in the case where a directional speaker that can present sound only to the performer is installed, the information processing device 200 may perform progress notification by outputting sound from the directional speaker toward the performer.

Figure 13:
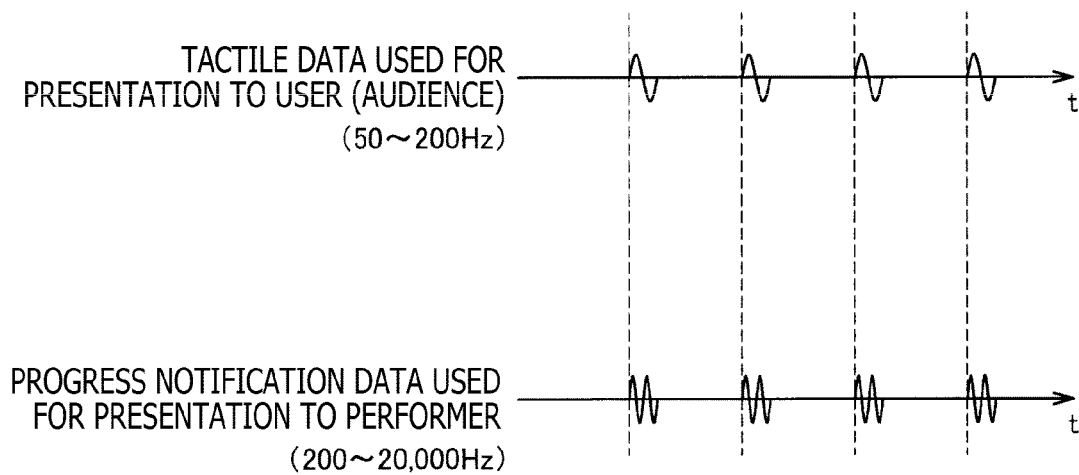
FIG. 13 is a view illustrating a further mode of the progress notification function.

For example, as depicted in FIG. 13, the acoustic data generation section 222 of the information processing device 200 may generate progress notification data by changing the frequency (for example, approximately 50 [Hz] to 200 [Hz]) of tactile data to be used for presentation of a tactile stimulus by each tactile data presentation section 121 of the sensation presentation device 100b worn by the user to a frequency in an audible region (for example, approximately 200 [Hz] to 20,000 [Hz]). Thereafter, the information processing device 200 causes the directional speaker to output sound by providing the progress notification data to the directional speaker.

Further, for example, as depicted in FIG. 14, the acoustic data generation section 222 may generate progress notification data mapped in an audible region (for example, 1,000 [Hz] or the like) by performing an AM modulation process or the like for tactile data to be used for presentation of a tactile stimulus. More particularly, the acoustic data generation section 222 may generate progress notification data by extracting an envelope indicative of an amplitude of tactile data by analyzing tactile data and mapping a carrier to be used for transmission wave to the envelope. Thereafter, the progress notification data is provided to the directional speaker, and the directional speaker demodulates the progress notification data to present sound to the performer.

It is to be noted that, in the case where BGM or sound effect is presented from the front speaker 290, the performer is sometimes hard to listen to sound presented from the directional speaker. Therefore, in the case where BGM or sound effect is presented from the front speaker 290, the frequency band of sound to be presented from the front speaker 290 may be changed. For example, as depicted in FIG. 15, the acoustic data generation section 222 may generate acoustic data of a frequency characteristic different from the frequency characteristic of the BGM presented from the front speaker 290. This makes it possible for the performer to distinguish the sound presented from the directional speaker and the BGM.

Further, for example, in the case where a light that can be viewed only by the performer is installed, the information processing device 200 may perform progress notification by turning on the light. More particularly, the lighting data generation section 223 of the information processing device 200 recognizes a timing at or a period during which a tactile stimulus is to be presented by analyzing tactile data and generates lighting data for turning on the light at the timing or during the period. It is to be noted that the lighting data generation section 223 may extract an impulse from the stimulus data as described above and generate lighting data for turning on the light at a timing corresponding to the impulse. Further, the lighting data generation section 223 may reflect the strength of the tactile stimulus on the intensity of light to be presented by the light. For example, the lighting data generation section 223 may generate progress notification data by performing PWM (Pulse Width Modulation) conversion for the tactile data. Since the lighting time of the light source (for example, an LED light source) of the light is controlled appropriately by the progress notification data that is provided to the light, the strength of the tactile stimulus is reflected on the intensity of light. Further, a display that can display a video or the like other than the light may be used for progress notification. In this case, on the display, contents of the sensation to be presented to the user, the timing of the presentation and so forth (for example, the number of seconds till the presentation or the like) can be displayed.

It is to be noted that, even in the case where progress notification is performed by a device other than the sensation presentation device 100a such as a directional speaker or a light, the sensation to be presented to a user is not limited to any other than the tactile stimulus. For example, even in the case where sound, a video, a smell, a taste or the like is to be presented, the information processing device 200 can implement progress notification using various devices other than the sensation presentation device 100a such as a directional speaker or a light.

Further, the information processing device 200 may change the method of progress notification to the performer in response to contents of a content such as theatrics, a situation when progress notification is performed or the like. For example, in the case where intense acting is being performed by a performer, the information processing device 200 can further increase the strength of the tactile stimulus or further increase the period during which the tactile stimulus is presented in order that the performer can easily perceive the tactile stimulus. Similarly, the information processing device 200 may further increase the magnitude of sound to be presented by the directional speaker or further increase the period for presentation. Further, in a scene in which mainly the feet are used for the acting such as when the player takes steps, the information processing device 200 may present a tactile stimulus to parts other than the feet. In a situation in which progress notification is difficult (for example, in a situation in which BGM is presented at a high volume, a situation in which the performer is acting violently or the like), the information processing device 200 may not perform progress notification.

Figure 16:
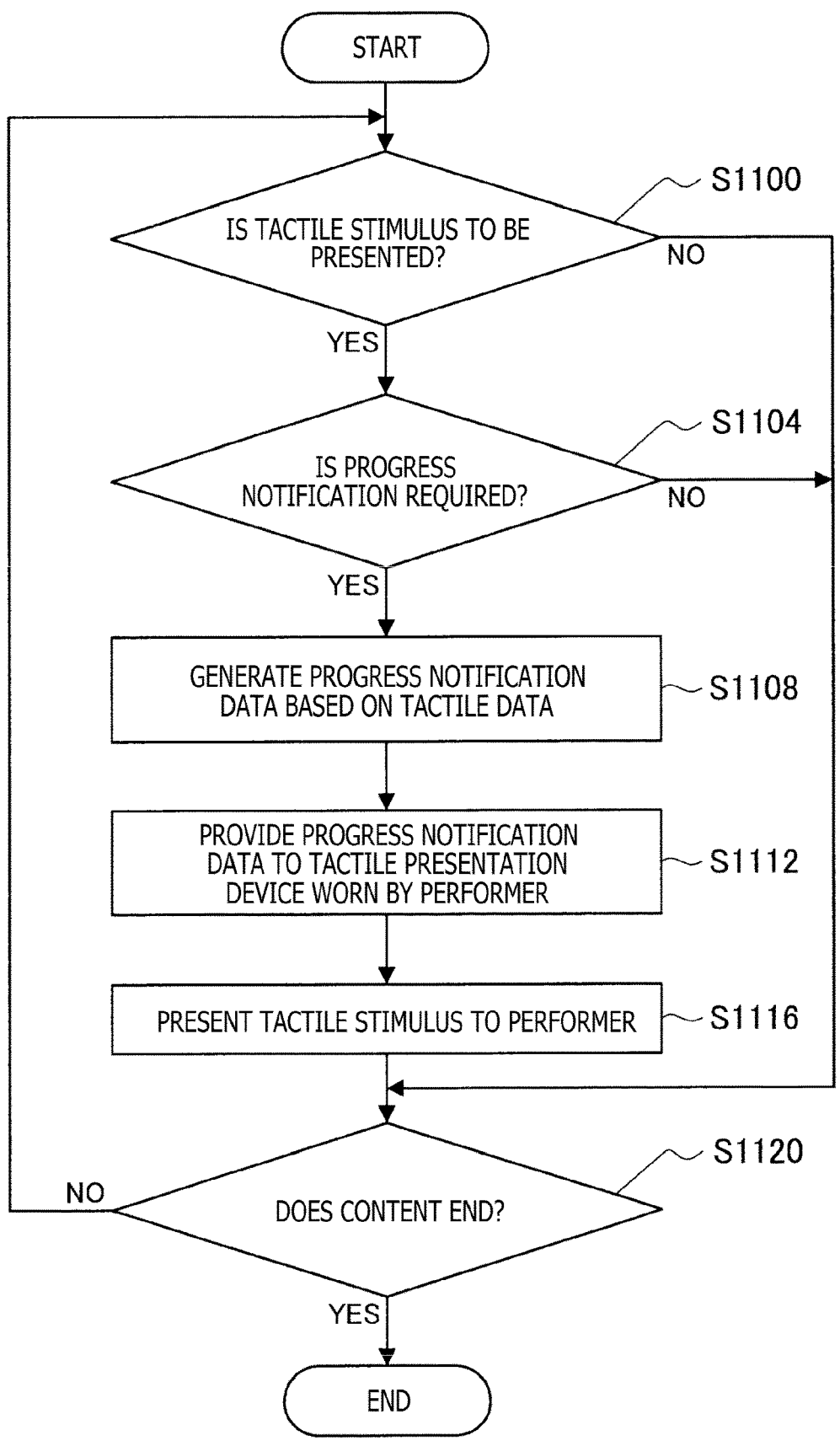
FIG. 16 is a flow chart illustrating an example of a flow of a progress notification process.

Now, an example of a flow of a progress notification process is described with reference to FIG. 16. FIG. 16 depicts an example of a flow of processing in the case where progress notification is implemented by a tactile stimulus presented also to a performer in the case where the tactile stimulus is presented to a user.

At step S1100, the tactile data generation section 221 of the information processing device 200 confirms whether or not a tactile stimulus is to be presented to a user (audience). For example, the tactile data generation section 221 analyzes tactile data to be provided to the sensation presentation device 100b worn by the user to confirm whether or not a tactile stimulus is to be presented. In the case where a tactile stimulus is to be presented to the user (step S1100/Yes), the tactile data generation section 221 decides at step S1104 whether or not progress notification is necessary to a performer. For example, the tactile data generation section 221 decides on the basis of setting in advance relating to requirement for progress notification whether or not progress notification is necessary.

In the case where progress notification to a performer is necessary (step S1104/Yes), at step S1108, the tactile data generation section 221 generates progress notification data on the basis of tactile data to be provided to the sensation presentation device 100b worn by the user. The generation method of progress notification data is such as described hereinabove. At step S1112, the communication section 230 provides the progress notification data to the sensation presentation device 100a worn by the performer.

At step S1116, the tactile data presentation section 121 of the sensation presentation device 100a to which the progress notification data is provided presents a tactile stimulus to the performer thereby to perform progress notification. It is to be noted that, at step S1100, in the case where a tactile stimulus is not to be presented to the user (step S1100/No), and in the case where progress notification to the performer is not necessary at step S1104 (step S1104/No), the processes at steps S1108 to S1116 are not performed. The processes described above are continued until the content comes to an end (step S1120/No).

<5. Sensation Presentation Notification Function by Light>

The progress notification function has been described above. The information processing system according to the present disclosure can implement a function of notifying each user using light that presentation of a sensation is performed to each user (the function is hereinafter referred to sometimes as "sensation presentation notification function by light"). Therefore, in the following, the sensation presentation notification function by light is described.

Figure 17:
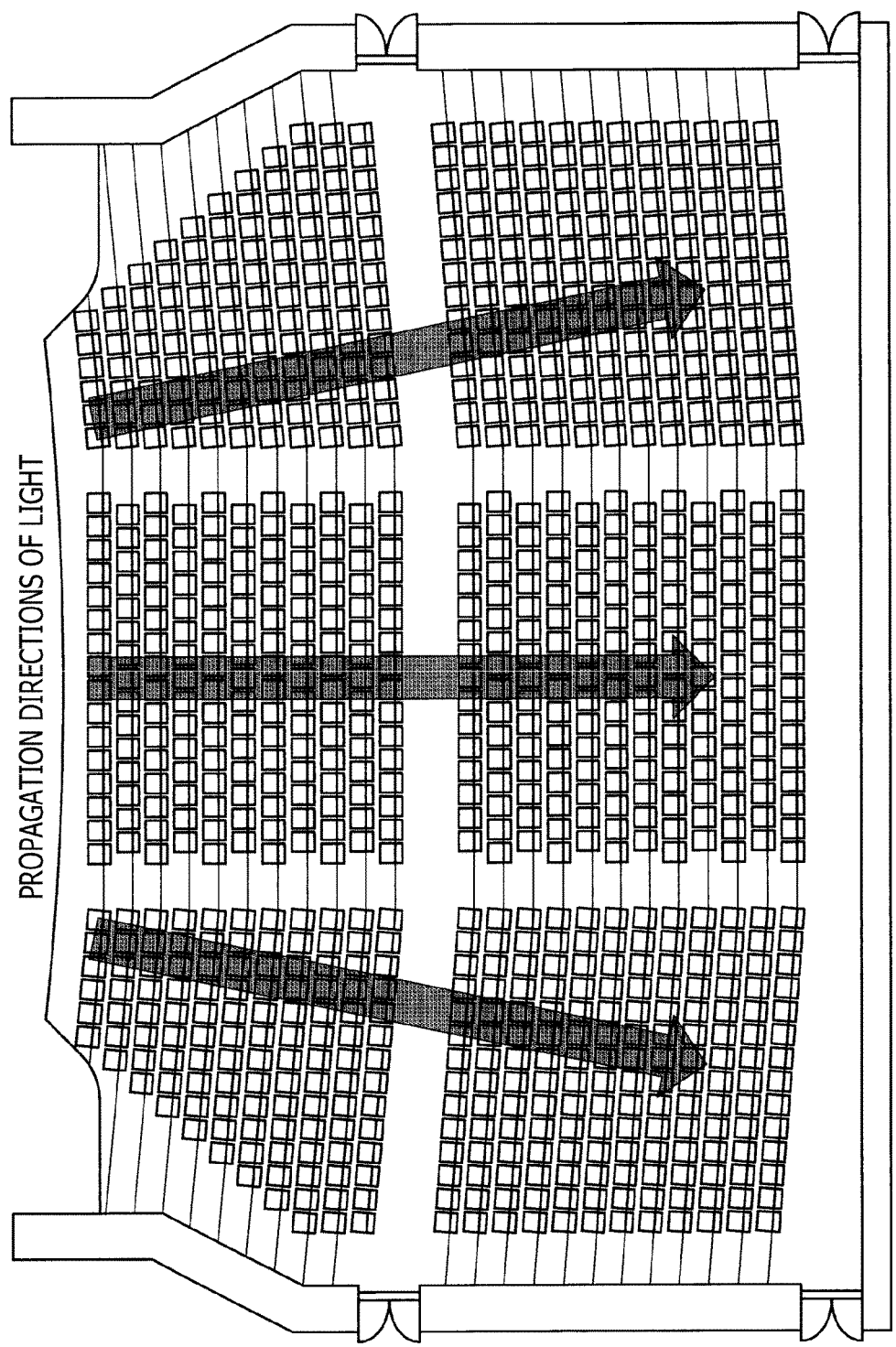
FIG. 17 is a view illustrating a sensation presentation notification function by light.

For example, such a representation that a tactile stimulus is presented and propagated in order from users near the stage to users remote from the stage in a live or theatrics stage as depicted in FIG. 17 is likely to intuitively connect also to an image of the tactile stimulus and is effective. Further, it is considered that a similar effect is obtained in regard to presentation not only of a tactile stimulus but also a sensation other than the tactile sensation such as sound, video, smell, and taste sensations. On the other hand, each user cannot recognize in what manner various sensations including a tactile stimulus are presented to the other users.

Therefore, the information processing system according to the present disclosure interlocks presentation of a sensation to each user and staging by light with each other to notify each user of a manner in which presentation of a sensation is being performed in the case where the irradiation range of the light changes in accordance with the presentation of a sensation to each user. More particularly, a light presentation section such as the light 320 or the projector 300 has a function of irradiating light for each user (or for each group of users). Then, the lighting data generation section 223 of the information processing device 200 generates lighting data (third data) such that irradiation of a light from the light presentation section such as the light 320 or the projector 300 is performed upon a user (first user) to whom presentation is to be performed at a timing (third timing) at which a tactile stimulus is to be presented to the user by the tactile data presentation section 121 or at a timing at which sound is to be presented to the user by the acoustic data presentation section 131. Then, the lighting data is provided to the light 320 through a predetermined network, and the light 320 can thereby irradiate light for each user (or for each group of users).

Here, the lighting data generation section 223 may implement sensation presentation notification by distinguishing a color of light to be irradiated upon a user to whom a sensation is to be presented from a color of light to be irradiated upon a user to whom a sensation is not to be presented. Further, in the case where the sensation presentation device 100 has a light emission function, the information processing device 200 may not perform sensation presentation notification using the light 320 (or the projector 300) but may cause the sensation presentation device 100 to emit light to implement sensation presentation notification. Further, in the case where the user holds another device that has a light emission function, the information processing device 200 may cause the device to emit light.

Figure 18:
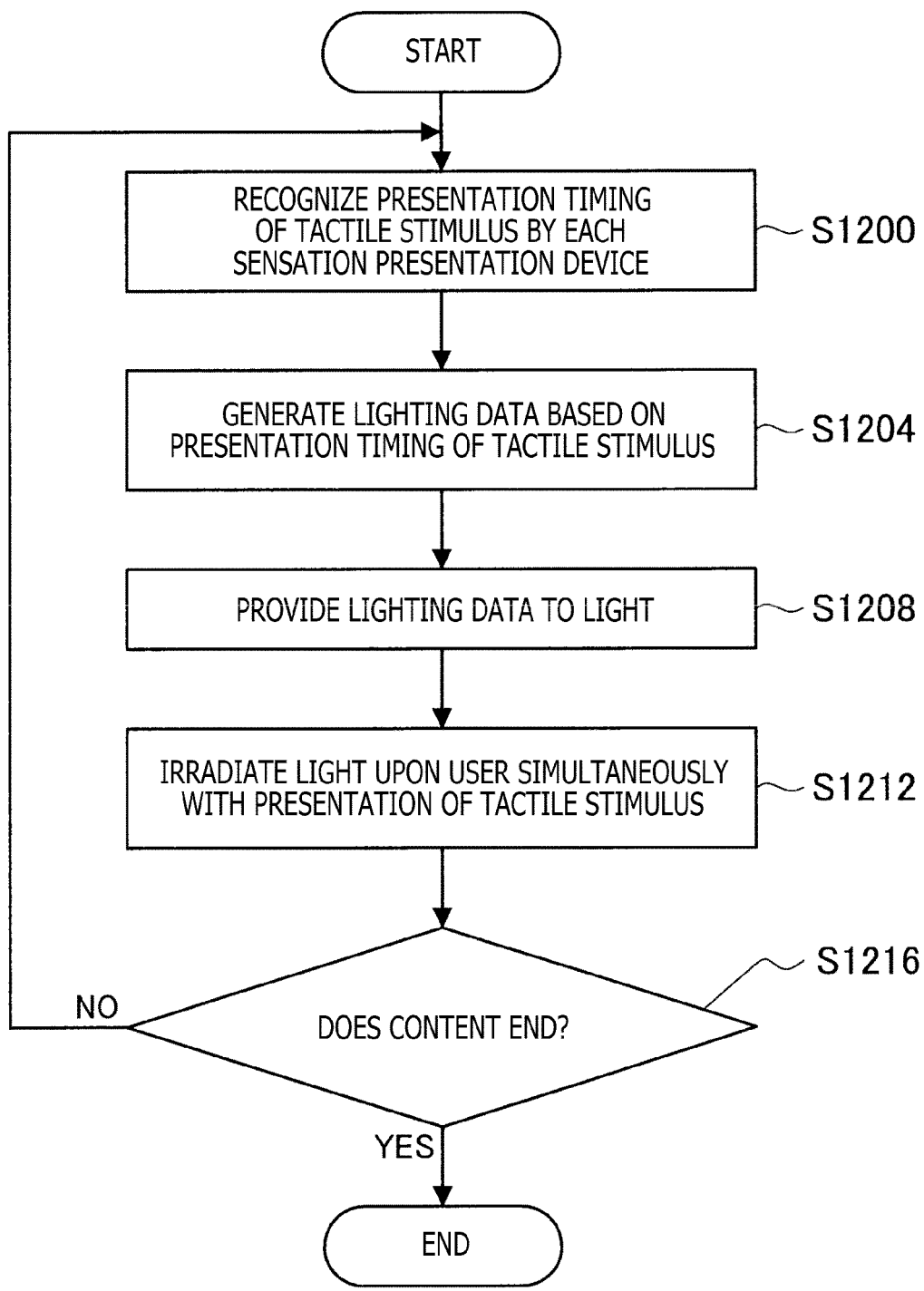
FIG. 18 is a flow chart illustrating an example of a flow of a sensation presentation notification process by light.

Now, an example of a flow of a sensation presentation notification process by light is described with reference to FIG. 18. FIG. 18 depicts an example of a flow of processes in the case where light is irradiated from the light 320 upon a user to whom a tactile stimulus is to be presented to perform sensation presentation notification.

At step S1200, the lighting data generation section 223 of the information processing device 200 recognizes a presentation timing of a tactile stimulus by each sensation presentation device 100. For example, the lighting data generation section 223 recognizes the presentation timing of a tactile stimulus by analyzing tactile data generated by the tactile data generation section 221.

At step S1204, the lighting data generation section 223 generates lighting data on the basis of the presentation timing of a tactile stimulus. More particularly, the lighting data generation section 223 generates lighting data such that light is irradiated from the light 320 upon the position (position coordinates or position of a seat) of a user to whom the tactile stimulus is to be presented at a timing at which each sensation presentation device 100 is to present a tactile stimulus. At step S1208, the communication section 230 provides lighting data to the light 320.

At step S1212, the light 320 to which the lighting data is provided irradiates light upon the user to whom a tactile stimulus is to be presented simultaneously with the presentation of the tactile stimulus thereby to perform sensation presentation notification. The processes described above are continued until the content comes to an end (step S1216/No).

<6. Example of Hardware Configuration>

The foregoing description is directed to a sensation presentation notification function by light. Now, an example of a hardware configuration of the information processing system according to the present disclosure is described.

(6.1. Sensation Presentation Device 100)

First, a hardware configuration of the sensation presentation device 100 is described. The sensation presentation device 100 has a structure that two vests including an outer vest having no size adjustment function and an inner vest having a size adjustment function are placed one on the other (structure that the outer vest covers the inner vest from above). Further, taking easiness to put on and take off by a user into consideration, the outer vest and the inner vest may be partially physically connected to each other, for example, at the opposite shoulder portions. Here, an example of the outer vest is depicted in FIG. 19 and an example of the inner vest is depicted in FIGS. 20A and 20B.

FIG. 19 depicts an example of the outer vest of the sensation presentation device 100 (that is depicted in FIG. 2) in which the acoustic data presentation sections 131 are disposed at the opposite shoulder regions. Further, the outer vest (and the inner vest depicted in FIG. 20A) includes an opening and closing mechanism 10 (for example, a fastener, a hook-and-loop fastener, a button or the like. It is to be noted that the opening and closing mechanism 10 is not limited to them) in the middle of the front body thereof. Consequently, the user can put on and take off the sensation presentation device 100 of the two-layer structure easily and efficiently without performing a movement of a high load such as to pass the head through the sensation presentation device 100. Further, in the case where the user feels uncomfortable or in a like case, the user can take off the sensation presentation device 100a easily and rapidly. Further, the outer vest includes a predetermined number of pockets 11 (in the example of FIG. 19, the pocket 11a to the pocket 11d) at the front body thereof. Consequently, since the outer vest can accommodate parts to be worn on a wrist or a foot hereinafter described, in the case where such parts are not used, management of the parts is facilitated. It is to be noted that, although mainly a case in which the sensation presentation device 100 of the vest type is adopted because that the user can move the arms easily, that the sensation presentation device 100 is superior in breathability and so forth are taken into consideration, the shape of the sensation presentation device 100 (especially, the shape of the outer vest) can be changed to various designs in accordance with an application of the same (contents of the content).

FIG. 20A depicts an example of the front body of the inner vest and FIG. 20B depicts an example of the back body of the inner vest. As depicted in FIGS. 20A and 20B, an adjustment mechanism 12 (in the example of FIGS. 20A and 20B, a hook-and-loop fastener) that can steplessly adjust the size of the inner vest is provided on side face portions of the inner vest. In order for the sensation presentation device 100 to transmit a tactile stimulus to the body of the user, it is desirable that the sensation presentation device 100 and the tactile data presentation section 121 are pressed against the body by appropriate pressure. However, the body of the user has a significant individual difference depending upon the age, sex and so forth. Therefore, the inner vest includes the adjustment mechanism 12 such that the contact pressure between the tactile data presentation section 121 and the body can be adjusted and an optimum tactile stimulus can be presented for each user. Further, since the inner vest is covered with the outer vest when it is used, the adjustment mechanism 12 is not exposed to the surface. Consequently, the designability of the wear is improved, and it can be prevented that large sound is generated to discomfort the audience around the user by operating the hook-and-loop fastener for attachment and removal in order for the user itself to perform size adjustment of the inner vest using the hook-and-loop fastener. Note that it is assumed that wearing of the sensation presentation device 100 by the user is completed before the content is started and size adjustment or putting on and taking off is not performed except during break time or the like. More particularly, it is assumed that a space for wearing (putting on and taking off) of the sensation presentation device 100 is provided at a position different from a seat on which the user is to be seated and a clerk in charge assists putting on or taking off of the sensation presentation device 100 by the user (naturally, this is not restrictive).

Further, the inner vest includes a fixation mechanism 13 that can fix the tactile data presentation section 121 (in the example of FIGS. 20A and 20B, a hook-and-loop fastener). When the sensation presentation device 100 presents a tactile stimulus to a user, desirably the tactile stimulus is presented to a similar position without being influenced by the individual difference (size of the body or the like) for each user. In particular, it is desirable that the arrangement of the tactile data presentation section 121 is adjusted in response to an individual difference for each user. Further, the position (region) at which a tactile stimulus is to be presented changes in response to contents or staging of a content such as a drama or a movie. For example, the positions at which a tactile stimulus is to be presented change depending upon the content such that, in the case of a drama A, they are four places of the front of the body; in the case of another dram B, they are six places of the front of the body; and in the case of a movie A, they are two places of the front in addition to the six places of the front of the body. Therefore, the inner vest has the fixation mechanisms 13 provided over a substantially overall face thereof to allow the tactile data presentation section 121 to be fixed at a desired position.

Figure 21A:
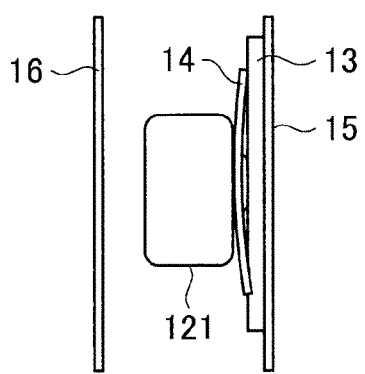
FIGS. 21A and 21B are view illustrating a fixation mode of a tactile data presentation section 121.
Figure 21B:
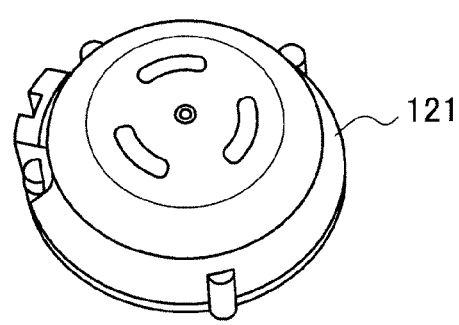

Here, a particular example of the fixation mode of the tactile data presentation section 121 is described with reference to FIGS. 21A and 21B. It is not assumed basically that, upon wearing by the user before a content is started, the fixation position of the tactile data presentation sections 121 is changed by the user itself (this is not restrictive). Therefore, as depicted in FIG. 21A, the inner vest has a two-sheet structure, and the fixation mechanism 13 is provided on the inner side of the two-sheet structure such that it cannot be touched by the user. The tactile data presentation section 121 can be fixed to the inner vest by being sandwiched by the fixation mechanism 13 (hook-and-loop fastener female or the like) and another fixation mechanism 14 (hook-and-loop fastener male or the like) which is a separate part. It is assumed that, as depicted in FIG. 21A, the fixation mechanism 13 is provided on an inner side face of an "outer side 15 of the inner vest" (outer vest side) in the two-sheet structure. In other words, it is assumed that the fixation mechanism 13 is not provided on an "inner side 16 of the inner vest" (user body side) in the two-sheet structure. Consequently, the tactile data presentation section 121 is pressed against the body of the user precisely by tensile force of the "outer side 15 of the inner vest" generated by fastening pressure of the adjustment mechanism 12 upon size adjustment.

Further, since the "inner side 16 of the inner vest" exists as a face, when the user puts on or takes off the sensation presentation device 100, the projecting tactile data presentation sections 121 are prevented from disturbing such putting on or taking off. Although the sensation presentation device 100 desirably has a two-layer structure of the inner vest and the outer vest as described hereinabove, only the inner vest may be used by itself taking easiness of putting on and taking off into consideration. Also in this case, since the inner vest has such a structure as described above, the tactile data presentation sections 121 can be prevented from being exposed to the surface, the designability is assured.

Further, as described hereinabove, the body of the user has an individual difference that is great depending upon the age or the sex. Therefore, such operation is conceivable that, for example, two kinds of wears including a wear for men (outer vest and inner vest) and a wear for women (outer vest and inner vest) are prepared before provision of a content and, in regard to the inner vest for women, presupposing that the adjustment mechanism 12 is rather narrowed down in accordance with the body, the fixation position of the tactile data presentation sections 121 is set to the relatively inner side in comparison with that for men. Similarly, also such operation is conceivable that, taking a height difference between men and women, the relative distance in the upward and downward direction between the tactile data presentation sections 121 is made comparatively short in comparison with that for men. Further, in regard to the wear for women, also such operation is conceivable that the tactile data presentation section 121 is arranged away from the chest. Also such operation is conceivable that three sizes of S/M/L (by a same wear) are prepared in response to the size of the body independently of the difference between men and women and fixation positions of the tactile data presentation sections 121 are made different among them as described hereinabove. Alternatively, also such operation is conceivable that the position and the number of tactile data presentation sections 121 are changed in response to contents of a content before starting of the content and design and generation of tactile data to be inputted to the tactile data presentation sections 121 are performed on the basis of the setting of the position and the number of the tactile data presentation sections 121.

Furthermore, the sensation presentation device 100 may be able to present, at a location to which a tactile stimulus is not presented depending upon a vest portion, a tactile stimulus by using some other part. For example, as depicted in A of FIGS. 22A, the sensation presentation device 100 includes connectors such that it can be electrically connected to additional tactile data presentation sections 121 (in FIG. 22A, a tactile data presentation section 121k to a tactile data presentation section 121p) by wirings 190 (in FIG. 22A, a wiring 190a to a wiring 190f) connected to the connectors. It is to be noted that, like the tactile data presentation section 121l and the tactile data presentation section 121m in FIG. 22A, each of the added tactile data presentation sections 121 includes a connector such that it can be electrically connected to further added tactile data presentation sections 121 by wirings 190 connected to the connectors. It is to be noted that, where a cable whose length can be adjusted (for example, a curled cable or a take-up type cable) is used as for the wirings 190, movement of the user can be prevented from being disturbed by the unnecessarily long wirings 190. Further, in the case where a tactile data presentation section 121 is not added by a wiring 190, a channel that can be used for an added tactile data presentation section 121 may be used for presentation of a tactile stimulus to another portion (for example, a vest portion). This makes it possible to present a variety of tactile stimuli to the portion. It is to be noted that the additional tactile data presentation sections 121 may be connected by wireless connection.

Further, the additional tactile data presentation sections 121 are fixed by a constant pressure to the portions of the body by a predetermined fixation mechanism (for example, a hook-and-loop fastener or the like). By this structure, for example, as depicted in FIG. 22A, the sensation presentation device 100 can present a tactile stimulus to the wrists, knees, and insteps other than the vest portions. It is to be noted that the position at which an additional tactile data presentation section 121 is to be fixed is not restricted specifically and can be changed flexibly in response to contents of a content.

Figure 22B:
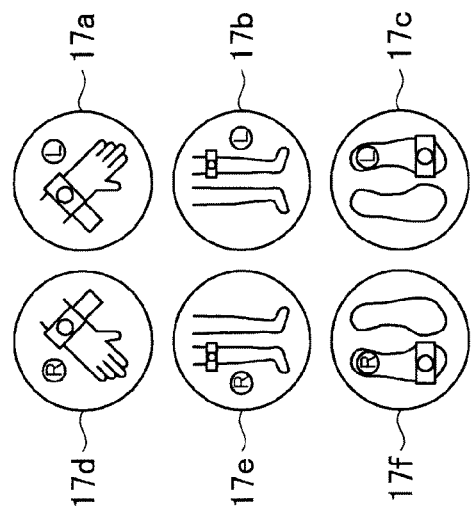
FIGS. 22A and 22B are view illustrating a wearing mode of additional tactile data presentation sections 121.
Figure 22A:
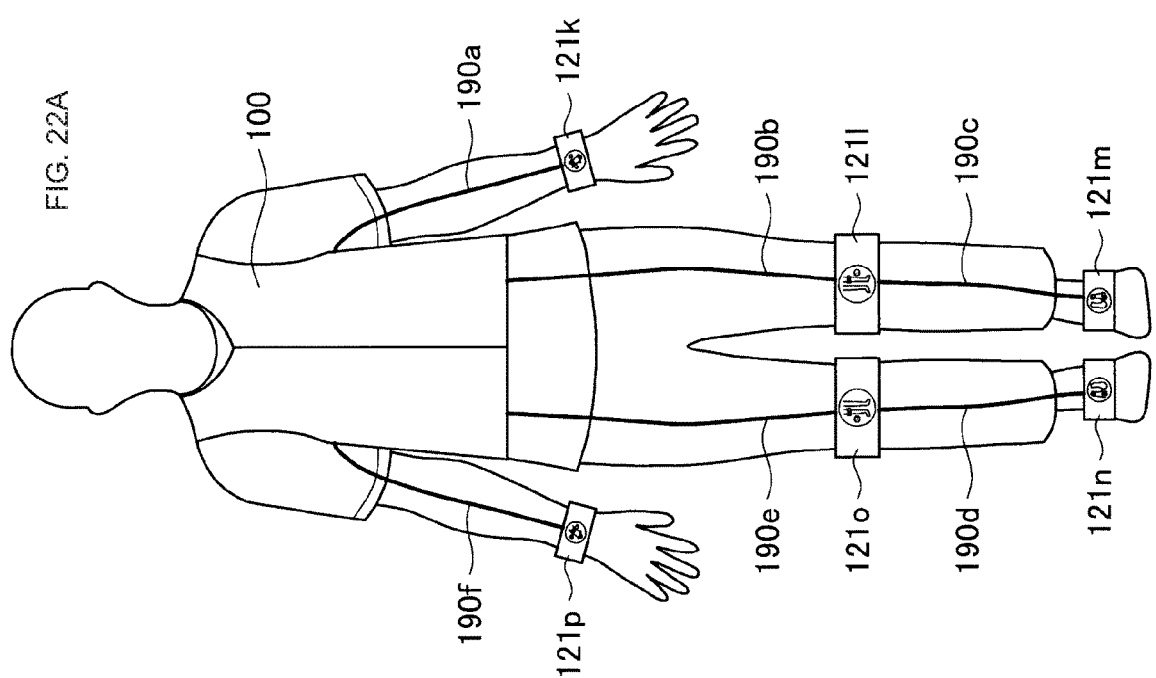

Here, as depicted in FIG. 22B, it is assumed that, to each of the additional tactile data presentation sections 121, a label 17 indicative of a fixation position (in FIG. 22B, a label 17a to a label 17f: an illustration, a character or the like representative of a fixation position is indicated) is affixed. This can prevent the user from fixing each additional tactile data presentation section 121 to a wrong position.

Figure 23:
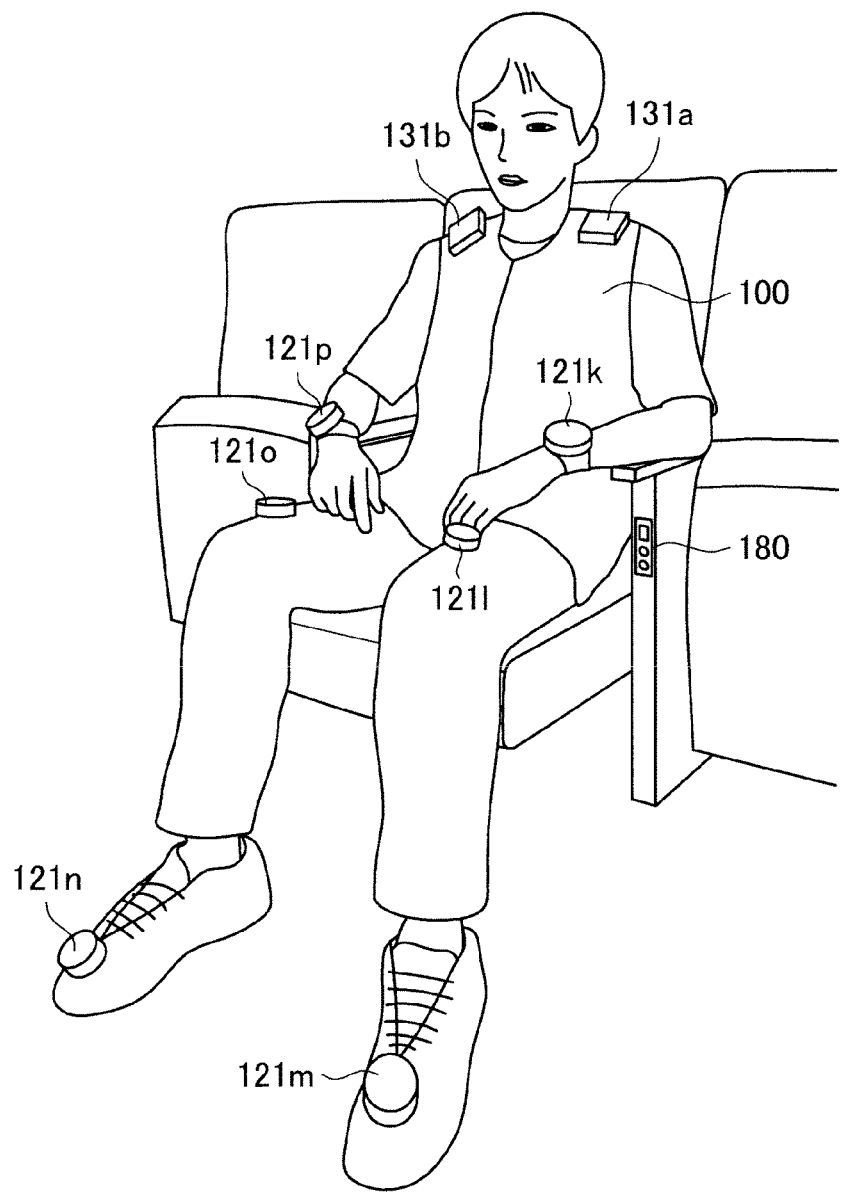
FIG. 23 is a view depicting a manner in which a user sits on a seat in a state in which it wears the sensation presentation device 100.

Now, devices that are used together with the sensation presentation device 100 are described. First, peripheral devices for a seat used in the case where a user is seated and receives provision of a content are described with reference to FIG. 23. FIG. 23 depicts a manner in which a user sits on the seat in a state in which it wears a sensation presentation device 100 (and the additional tactile data presentation section 121k to tactile data presentation section 121p). Thus, it is assumed that, for each seat, an operation panel 180 that is used for a predetermined operation by a user is installed.

Figure 24A:
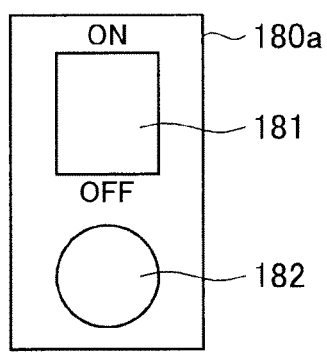
FIGS. 24A and 24B is a are view illustrating an operation panel 180.
Figure 24B:
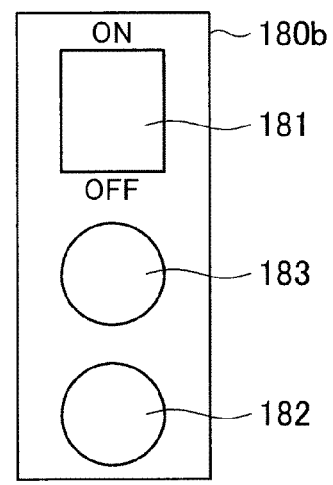

Here, particular examples of the operation panel 180 are described with reference to FIGS. 24A and 24B. The operation panel 180a depicted in FIG. 24A includes a switch 181, and the user can operate the switch 181 to switch presentation of various sensations including a tactile stimulus ON/OFF. Further, a connector 182 (female) is provided for the operation panel 180a, and the user can place the sensation presentation device 100 into an operable state by inserting a connector (male) provided for the sensation presentation device 100 into the connector 182. Meanwhile, the operation panel 180b depicted in FIG. 24B further includes a volume adjustment mechanism 183, and the user can adjust a tactile stimulus or the volume of sound to be presented by the sensation presentation device 100 to a desired magnitude.

It is to be noted that, for the sensation presentation device 100, a plurality of types (size of S/M/L, for adult/child, for male/female, color, notation number) is provided, and by connecting a sensation presentation device 100 to the connector 182, the type of the sensation presentation device 100 can be identified by the information processing system (especially by the information processing device 200) depending upon the resistance value for type detection incorporated in the sensation presentation device 100 or a contrivance for ON/OFF detection such as a DIP switch. The information processing system (especially the information processing device 200) may change a signal (volume or the like) to be supplied to the wear in response to the identified type.

(6.2. Information Processing Device 200)

Subsequently, a hardware configuration of the information processing device 200 is described with reference to FIG. 25.

Figure 25:
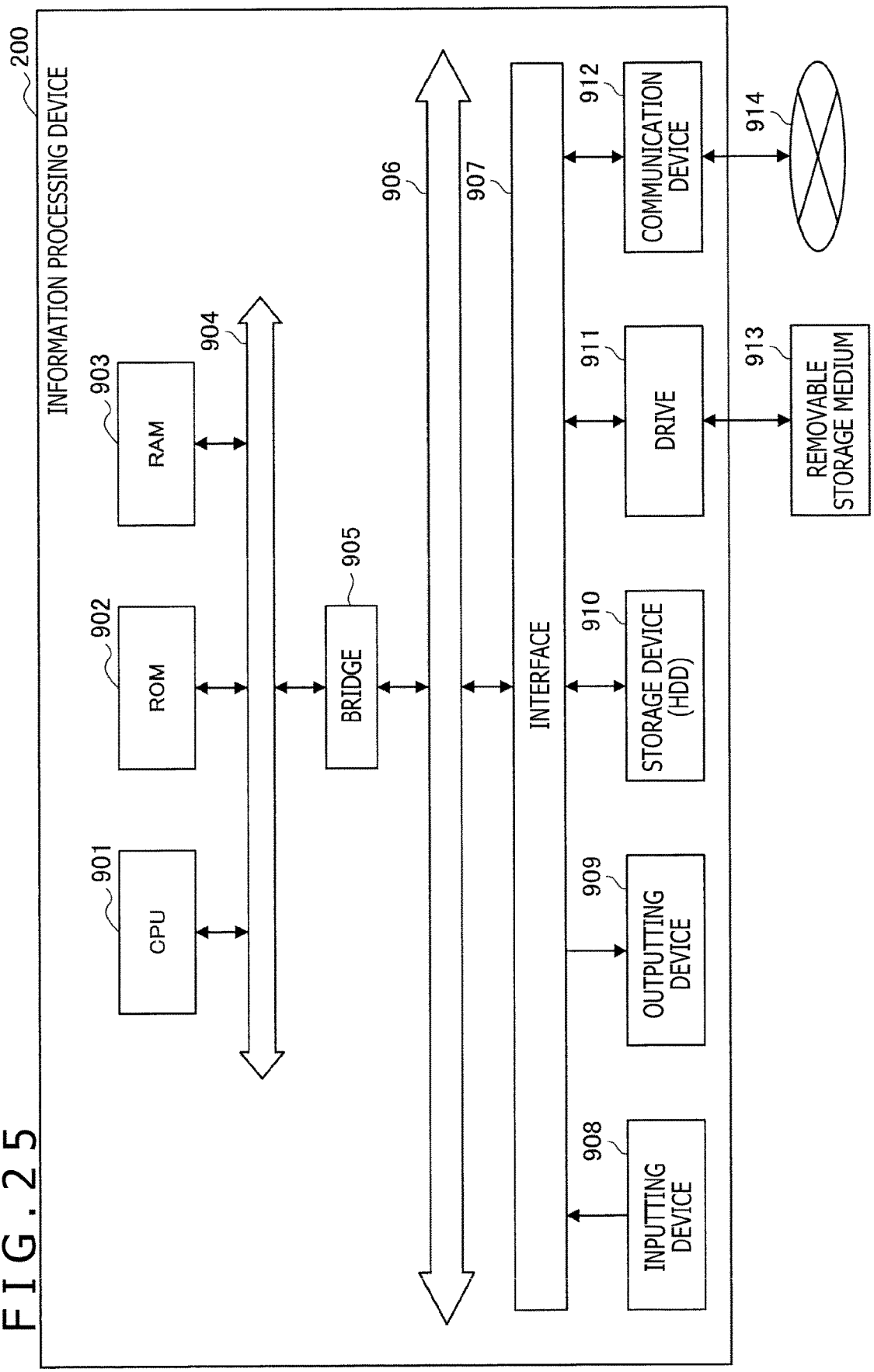
FIG. 25 is a block diagram depicting an example of a hardware configuration of the information processing device 200.

As depicted in FIG. 25, the information processing device 200 includes a CPU (Central Processing Unit) 901, a ROM (Read Only Memory) 902, a RAM (Random Access Memory) 903, a host bus 904, a bridge 905, an external bus 906, an interface 907, an inputting device 908, an outputting device 909, a storage device (HDD) 910, a drive 911, and a communication device 912.

The CPU 901 functions as an arithmetic operation processing device and a control device and controls general operation in the information processing device 200 in accordance with various programs. Further, the CPU 901 may be a microprocessor. The ROM 902 stores programs, arithmetic operation parameters and so forth to be used by the CPU 901. The RAM 903 temporarily stores a program to be used in execution of the CPU 901, parameters that change suitably in such execution and so forth. They are connected to each other by the host bus 904 configured from a CPU bus or the like. By cooperation of the CPU 901, the ROM 902, and the RAM 903, functions of the control section 210 and the generation section 220 are implemented.

The host bus 904 is connected to the external bus 906 such as a PCI (Peripheral Component Interconnect/Interface) bus through the bridge 905. It is to be noted that the host bus 904, the bridge 905, and the external bus 906 need not necessarily be configured separately from each other and the functions of them may be incorporated in one bus.

The inputting device 908 is configured from inputting means for allowing a user to input information such as a mouse, a keyboard, a touch panel, buttons, a microphone, switches, and levers, and an input controlling circuit that generates an input signal on the basis of an input by a user and outputs the input signal to the CPU 901. The user who uses the information processing device 200 can input various data and instruct a processing operation to various devices by operating the inputting device 908. The functions of the controller 260 are implemented by the inputting device 908.

The outputting device 909 includes display devices such as, for example, a CRT (Cathode Ray Tube) display device, a liquid crystal display (LCD) device, an OLED (Organic Light Emitting Diode) device, and lamps. The functions of the display section 240 are implemented by the outputting device 909.

The storage device 910 is a device for data storage. The storage device 910 may include a storage medium, a recording device for recording data into the storage medium, a reading out device for reading out data from the storage medium, a deletion device for deleting data recorded in the storage medium and so forth. The storage device 910 is configured, for example, from an HDD (Hard Disk Drive). The storage device 910 drives the hard disk to store programs to be executed by the CPU 901 and various data. The functions of the storage section 250 are implemented by the storage device 910.

The drive 911 is a reader/writer for a storage medium and is built in or externally attached to the information processing device 200. The drive 911 reads out information recorded on a removable storage medium 913 such as a magnetic disk, an optical disk, a magneto-optical disk, or a semiconductor memory loaded therein and outputs the information to the RAM 903. Further, also it is possible for the drive 911 to write information into the removable storage medium 913.

The communication device 912 is a communication interface configured from a communication device for connecting, for example, to a communication network 914 and so forth. The functions of the communication section 230 are implemented by the communication device 912.

<7. Remarks>

The foregoing description is directed to an example of a hardware configuration in the information processing system according to the present disclosure. Now, as remarks, operational aspects in the information processing system according to the present disclosure are described.

(7.1. Confirmation of Operation of Sensation Presentation Device 100)

In the case where the information processing system according to the present disclosure is used, before starting of a content, an operation confirmation work can be performed in a state in which the sensation presentation device 100 is connected to the connector 182 of the operation panel 180.

In the operation confirmation work, as a first step, for the object of confirmation of a conduction state and so forth, audible sound is sequentially generated from the tactile data presentation sections 121 (actuators) of the sensation presentation device 100 such that a confirmer performs operation confirmation with its ears. At this time, the audible sound may be changed for each tactile data presentation section 121 (for example, identification information such as "1," "2," "3" and so forth is allocated to the individual tactile data generation section 221 of each sensation presentation device 100 such that the respective identification information is outputted as audible sound to the tactile data presentation sections 121). As a second step, for the object of confirmation of a failure state of the tactile data presentation sections 121, simple waveforms of low audibility such as a Sin wave of 100 [Hz] are sequentially inputted to the tactile data presentation sections 121. For example, in the case where some abnormal sound is heard by the confirmer at the second step, it is estimated that the tactile data presentation section 121 suffers from damage or the like.

The works at the first step and the second step are performed by rendering the sensation presentation devices 100 operative one by one such that sounds emitted from the sensation presentation device 100 may not mix with each other. For example, the confirmer successively performs the works at the first step and the second step while operating the switch 181 of the operation panel 180 to sequentially switching the sensation presentation devices 100 ON/OFF.

It is to be noted that generation of audible sound from the sensation presentation devices 100 or the like may be performed while being displaced little by little for each sensation presentation device 100 such that the confirmer can perform the operation confirmation work without moving from a seat to another seat. Further, such dealing is conceivable that identification information such as "1," "2," or "3" is allocated to each sensation presentation device 100 while such identification information as "1," "2," or "3" is allocated to each tactile data generation section 221 of each sensation presentation device 100 and a combination of identification information of a sensation presentation device 100 and a tactile data presentation section 121 like "1-1," "1-2," or "1-3" is outputted to the tactile data presentation section 121 as audible sound. This makes it possible for the confirmer to perform the operation confirmation work without moving from a position at which the operator can hear the audible sound emitted from all sensation presentation devices 100. Further, the hearing work of the audible sound may be performed by a device for exclusive use. Further, an acceleration sensor may be provided in each tactile data presentation section 121 such that operation confirmation is performed by analysis or the like of acceleration data when each tactile data presentation section 121 vibrates.

(7.2. Dealing of Operator)

An operator who operates the controller 260 described above would be positioned in a control booth behind (or in the middle of) the auditorium such that the operator can overlook the stage and the auditorium, and would operate interfaces provided on the controller 260 such as a touch panel and physical switches in accordance with a timing of movement of a performer on the stage in response to a progress determined in advance.

By a predetermined operation performed for the controller 260, devices relating to state effects such as acoustics, lighting, videos, or tactile stimuli can be collectively controlled on the real time basis. For example, the operator can collectively control the strength of the stage effects outputted from the devices relating to the stage effects such as acoustics, lighting, videos, or tactile stimuli on the real time basis by an operation of a slide bar provided on the controller 260. For example, if the operator lowers the slide bar, then the sound volume decreases and the strength of tactile stimuli presented by the tactile data presentation sections 121 decreases or the lighting becomes dark. Further, for example, every time the operator depresses a predetermined button, an event in the content switches, and the devices relating to the stage effects such as acoustics, lighting, videos, or tactile stimuli can be collectively controlled on the real time basis in accordance with a program associated with the event after the switching. It is to be noted that, at this time, events different from each other may be allocated to different buttons.

Further, not only a user but also an operator can receive feedback of stage effects being experienced by the user by wearing a headphone for acoustic presentation and a sensation presentation device 100 for tactile presentation. It is to be noted that, although presentation of a sensation to the user is performed with the sound delay amount into consideration (at a timing delayed by the sound delay amount), in feedback to the operator, presentation of a sensation may be performed without taking the sound delay amount into consideration (presentation of sound by the headphone and presentation of a sensation by the sensation presentation device 100 may be performed simultaneously). Further, a timekeeper who performs progress management may be deployed separately from the operator in the control booth such that the operator and the timekeeper perform a work cooperatively.

Although the preferred embodiment of the present disclosure has been described in detail with reference to the accompanying drawings, the technical scope of the present disclosure is not limited to such embodiment. It is apparent that a person who has common knowledge in the technical field to which the present disclosure pertains can conceive various alterations or modifications within the scope of the technical idea disclosed in the claims, and it is recognized that they naturally belong to the technical scope of the present disclosure.

Further, the advantageous effects described in the present specification are explanatory or exemplary to the last and not restrictive. In particular, the technology according to the present disclosure can demonstrate other advantageous effects that are apparent to those skilled in the art from the description of the present specification together with or in place of the effects described above.

It should be noted that the following configurations also fall within the technical scope of the present disclosure:

(1)

An information processing device, including:

a generation section that generates, on the basis of a difference between a first timing at which a sound is to be outputted from an acoustic presentation section and a second timing at which the sound is to be perceived by a first user, first data to be used for presentation of a sensation to the first user by a sensation presentation section worn by the first user.

(2)

The information processing device according to (1) above, in which the presentation of the sensation is performed at a third timing that is determined on the basis of the difference.

(3)

The information processing device according to (2) above, in which
the third timing is substantially same as the second timing.

(4)

The information processing device according to (2) or (3) above, in which
the generation section generates second data that is used for notification of the third timing to a second user on the basis of the first data.

(5)

The information processing device according to (4) above, in which
the second data is used for presentation of a sensation to the second user.

(6)

The information processing device according to (4) or (5) above, in which
the notification is performed at a timing substantially same as the third timing.

(7)

The information processing device according to any one of (4) to (6) above, in which
the second user includes a user who provides a content in regard to which the presentation of the sensation to the first user is performed.

(8)

The information processing device according to any one of (2) to (7) above, in which
a plurality of the first users exists, and
the presentation of the sensation is performed for each first user or for each group of the first users.

(9)

The information processing device according to (8) above, in which
the first user to whom the sensation is to be presented is irradiated by light from a light presentation section at the third timing, and
the generation section generates third data to be used for the irradiation of the light.

(10)

The information processing device according to any one of (1) to (9) above, in which
the second timing includes a timing at which the sound is detected by a sound detection section worn by the first user.

(11)

The information processing device according to (10) above, in which
the sound detection section is worn in a proximity of an ear of the first user.

(12)

The information processing device according to any one of (1) to (11) above, in which
the difference is estimated on the basis of a positional relationship between the acoustic presentation section and the first user.

(13)

The information processing device according to any one of (1) to (12) above, in which
the sensation includes at least one of a tactile or an auditory.

(14)

An information processing method executed by a computer, the method including:
generating, on the basis of a difference between a first timing at which a sound is to be outputted from an acoustic presentation section and a second timing at which the sound is to be perceived by a first user, first data to be used for presentation of a sensation to the first user by a sensation presentation section worn by the first user.

(15)

A program for causing a computer to implement:
generating, on the basis of a difference between a first timing at which a sound is to be outputted from an acoustic presentation section and a second timing at which the sound is to be perceived by a first user, first data to be used for presentation of a sensation to the first user by a sensation presentation section worn by the first user.

REFERENCE SIGNS LIST

100 Sensation presentation device
110 Control section
111 Tactile data processing section
112 Acoustic data processing section
120 Tactile presentation section
121 Tactile data presentation section
130 Sound presentation section
131 Acoustic data presentation section
140 Communication section
150 Sensor section
160 Storage section
170 Sound collection section
200 Information processing device
210 Control section
211 Delay measurement section
220 Generation section
221 Tactile data generation section
222 Acoustic data generation section
223 Lighting data generation section
230 Communication section
240 Display section
250 Storage section
260 Controller
270 Audio IF
280 Amplifier
290 Front speaker
300 Projector
310 Screen
320 Light
330 Smoke generator
340 Wind generator

The invention claimed is:

1. An information processing device, comprising:
at least one processor configured to:
  calculate a difference between a first timing and a second timing based on a positional relationship between an acoustic presentation device and a first user, wherein
    the first timing is a timing at which a sound is output from the acoustic presentation device, and
    the second timing is a timing at which the sound is perceived by the first user,
  generate first data based on the calculated difference between the first timing and the second timing; and
  control a sensation presentation device to present first sensation to the first user, wherein
    the sensation presentation device is controlled based on the first data,
    the sensation presentation device is wearable by the first user, and
    the acoustic presentation device is external to the sensation presentation device.

2. The information processing device according to claim 1, wherein the at least one processor is further configured to:
   determine a third timing based on the calculated difference; and
   control the sensation presentation device to present the first sensation at the third timing.

3. The information processing device according to claim 2, wherein the third timing is substantially same as the second timing.

4. The information processing device according to claim 2, wherein
   the at least one processor is further configured to generate second data for notification of the third timing to a second user, and
   the second data is generated based on the first data.

5. The information processing device according to claim 4, wherein
   the at least one processor is further configured to control presentation of a second sensation to the second user, and
   the presentation of the second sensation to the second user is controlled based on the second data.

6. The information processing device according to claim 4, wherein the at least one processor is further configured output the notification at a fourth timing substantially same as the third timing.

7. The information processing device according to claim 4, wherein the second user provides content associated with the presentation of the first sensation.

8. The information processing device according to claim 2, wherein
   the at least one processor is further configured to control the sensation presentation device to present the first sensation for one of:
      each first user of a plurality of first users, or
      each group of a plurality of groups of the plurality of first users, and the plurality of first users includes the first user.

9. The information processing device according to claim 8, wherein the at least one processor is further configured to:
   generate third data for irradiation of the first user by light; and
   control a light presentation device to irradiate the first user by the light at the third timing, wherein the light presentation device is controlled based on the generated.

10. The information processing device according to claim 1, wherein the second timing corresponds to a timing at which the sound is detected by a sound detection device wearable by the first user.

11. The information processing device according to claim 10, wherein the sound detection device is wearable in a proximity of an ear of the first user.

12. The information processing device according to claim 1, wherein the first sensation includes at least one of a tactile sensation or an auditory sensation.

13. The information processing device according to claim 1, wherein the at least one processor is further configured to acquire the second timing based on detection of the sound in proximity of the first user.

14. An information processing method, comprising:
   calculating a difference between a first timing and a second timing based on a positional relationship between an acoustic presentation device and a user, wherein
      the first timing is a timing at which a sound is output from the acoustic presentation device, and
      the second timing is a timing at which the sound is perceived by the user;
   generating first data based on the calculated difference between the first timing and the second timing; and
   controlling a sensation presentation device to present a sensation to the user, wherein
      the sensation presentation device is controlled based on the first data,
      the sensation presentation device is wearable by the user, and
      the acoustic presentation device is external to the sensation presentation device.

15. A non-transitory computer-readable medium having stored thereon, computer-executable instructions, which when executed by a computer, cause the computer to execute operations, the operations comprising:
   calculating a difference between a first timing and a second timing based on a positional relationship between an acoustic presentation device and a user, wherein
      the first timing is a timing at which a sound is output from the acoustic presentation device, and
      the second timing is a timing at which the sound is perceived by the user;
   generating first data based on the calculated difference between the first timing and the second timing; and
   controlling a sensation presentation device to present a sensation to the user, wherein
      the sensation presentation device is controlled based on the first data,
      the sensation presentation device is wearable by the first user, and
      the acoustic presentation device is external to the sensation presentation device.

* * * * *